US012777355B2

(12) United States Patent
Li et al.

(10) Patent No.: US 12,777,355 B2
(45) Date of Patent: Oct. 27, 2026

(54) INTER-CELL MEASUREMENT REPORTING METHOD, DEVICE, APPARATUS, AND STORAGE MEDIUM

(71) Applicant: DATANG MOBILE COMMUNICATIONS EQUIPMENT CO., LTD., Beijing (CN)

(72) Inventors: Hui Li, Beijing (CN); Qiubin Gao, Beijing (CN); Runhua Chen, Beijing (CN); Yajuan Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 411 days.

(21) Appl. No.: 18/560,092

(22) PCT Filed: May 6, 2022

(86) PCT No.: PCT/CN2022/091256

§ 371 (c)(1),
(2) Date: Nov. 9, 2023

(87) PCT Pub. No.: WO2022/237651

PCT Pub. Date: Nov. 17, 2022

(65) Prior Publication Data

US 2024/0236747 A1 Jul. 11, 2024

(30) Foreign Application Priority Data

May 11, 2021 (CN) ......................... 202110512259.4

(51) Int. Cl.
*H04W 24/10* (2009.01)
*H04W 36/00* (2009.01)

(52) U.S. Cl.
CPC ....... *H04W 24/10* (2013.01); *H04W 36/0085* (2018.08)

(58) Field of Classification Search
CPC .......................... H04W 24/10; H04W 36/0085
See application file for complete search history.

(56) References Cited

U.S. PATENT DOCUMENTS 12,063,085 B2 * 8/2024 Bai ...................... H04L 27/261
12,439,284 B2 * 10/2025 Li ......................... H04W 24/02
(Continued)

FOREIGN PATENT DOCUMENTS

CN 102882612 A 1/2013
CN 106304174 A 1/2017
(Continued)

OTHER PUBLICATIONS

Office action from Chinese Patent Application No. 202110512259.4 dated Feb. 25, 2025 with search report, and its English translation.
(Continued)

*Primary Examiner* — Deepa Belur
(74) *Attorney, Agent, or Firm* — Ladas & Parry, LLP

(57) ABSTRACT

An inter-cell measurement reporting method, a device, an apparatus, and a storage medium are provided. The method performed by the terminal device includes: receiving measurement reporting configuration and indication information of a to-be-measured cell sent by a network device; determining a to-be-measured cell according to the indication information; measuring the to-be-measured cell according to the measurement reporting configuration to obtain a first measurement result; reporting the first measurement result to the network device. The embodiments of the present disclosure may save a signaling overhead.

13 Claims, 4 Drawing Sheets

(56) References Cited

U.S. PATENT DOCUMENTS

| | | | | |
|---|---|---|---|---|
| 2014/0112184 | A1 | 4/2014 | Chai | |
| 2014/0162668 | A1* | 6/2014 | Na | H04W 72/121<br>455/450 |
| 2021/0329512 | A1* | 10/2021 | Jassal | H04W 36/0058 |
| 2023/0009770 | A1 | 1/2023 | Li | |
| 2023/0180078 | A1* | 6/2023 | Zhang | H04W 36/0085<br>370/252 |
| 2023/0189026 | A1 | 6/2023 | Li | |
| 2023/0354473 | A1* | 11/2023 | Cao | H04L 12/189 |
| 2024/0039598 | A1* | 2/2024 | Kim | H04L 25/0224 |

FOREIGN PATENT DOCUMENTS

| | | | |
|---|---|---|---|
| CN | 110972155 | A | 4/2020 |
| CN | 111095824 | A1 | 5/2020 |
| CN | 111182578 | A | 5/2020 |
| CN | 111512685 | A | 8/2020 |
| WO | 2014166456 | A2 | 10/2014 |
| WO | 2020029218 | A1 | 2/2020 |
| WO | 2020211094 | A1 | 10/2020 |

OTHER PUBLICATIONS

International Search Report for International Patent Application No. PCT/CN2022/091256 issued by the International Bureau of WIPO on Jun. 29, 2022 and its English translation provided by WIPO.

Written opinion for International Patent Application No. PCT/CN2022/091256 issued by the International Bureau of WIPO on Jun. 29, 2022 and its English translation provided by WIPO.

International primary report on patentability for International Patent Application No. PCT/CN2022/091256 issued by the International Bureau of WIPO on Nov. 14, 2023 and its English translation provided by WIPO.

Office Action and search report in Chinese patent Application No. 202110512259.4, issued on Sep. 20, 2024.

Supplementary European Search Report in EP Application No. 22806617.1, issued on Oct. 16, 2024.

“Enhancements on Multi-beam Operation”, ZTE, 3GPP TSG RAN WG1 Meeting #104-e, R1-2100285, Jan. 19, 2021.

“Further discussion on multi beam enhancement”, vivo, 3GPP TSG RAN WG1 #104-e, R1-2100421, Jan. 19, 2021.

* cited by examiner

INTER-CELL MEASUREMENT REPORTING METHOD, DEVICE, APPARATUS, AND STORAGE MEDIUM

CROSS-REFERENCE TO RELATED APPLICATIONS

This application is the U.S. national phase of PCT Application No. PCT/CN2022/091256 filed on May 6, 2022, which claims a priority to Chinese Patent Application No. 202110512259.4, titled "Inter-Cell Measurement Reporting Method, Device, Apparatus, and Storage Medium", filed before CNIPA on May 11, 2021, the disclosures of which are incorporated herein by reference in their entireties.

TECHNICAL FIELD

The present disclosure relates to the technical field of mobile communications, and in particular, to an inter-cell measurement reporting method, an inter-cell measurement reporting device, an inter-cell measurement reporting apparatus, and a storage medium.

BACKGROUND

In an existing system, a terminal device needs to perform cell handover when moving between cells. FIG. 1 shows an existing cell handover process. The method specifically includes the following steps 101 to 105:

Step 101: a source 5G base station (gNB) performs measurement configuration to a terminal device, and a measurement result of the terminal device is used to assist the source gNB to perform a handover decision;

Step 102: the terminal device performs measurement reporting according to the measurement configuration, where the measurement result is reported to the source gNB;

Step 103: the source gNB sends a handover command to the terminal device, where the handover command carries RRC reconfiguration information;

Step 104: after receiving the handover command, the terminal device performs synchronization with a target gNB and accesses a target cell by using a contention-based or non-contention-based random access procedure;

Step 105: data transmission is performed, for example, the target gNB sends data to the terminal device.

In step 101, the measurement configuration of the source gNB to the terminal device mainly includes configuring the terminal device to measure SSBs of a local cell and a neighboring cell, and measuring a reference signal (CSI-RS for mobility) for mobility management of the local cell and the neighboring cell.

In step 102, the measurement result reported to the source gNB by the terminal device is Layer 3 RSRP (i.e. L3-RSRP), which is implemented by introducing an additional filter into the layer 3.

In step 104, the contention-based or non-contention-based random access procedure used by the terminal device includes the following four-step random access procedure:

Step 1: the terminal device sends a preamble sequence (i.e., message 1, Msg 1) on a Physical Random Access Channel (PRACH) resource;

Step 2: the terminal device receives a Random Access Response message RAR (i.e., message 2, Msg 2) on a Physical Downlink Control Channel (PDCCH)/Physical Downlink Shared Channel (PDSCH), the message further includes an uplink Timing Advance (TA) adjustment amount and an uplink scheduling grant transmitted on the message 3, and a temporary cell-radio network temporary identity (TC-RNTI);

Step 3: the terminal device sends a Radio Resource Control (RRC) request (i.e., message 3, Msg 3) on a PUSCH;

Step 4: the terminal device receives a contention resolution message (i.e., message 4, MSG 4) on the PDSCH, and the TC-RNTI is upgraded to a Cell Radio Network Temporary Identifier (C-RNTI).

In step 105, before the target gNB sends data to the terminal device, channel measurement information needs to be configured for the terminal device by the target gNB, and after the terminal device reports the channel state information, new data transmission is performed.

It can be seen from the foregoing that a current cell handover process involves processes of the foregoing step 103 (i.e., a transmission handover command) and the step 104 (i.e. a synchronization process). In this way, for a high-speed mobile terminal device, a delay of the cell handover can reduce a data transmission quality, so that link reliability cannot be ensured.

In order to solve the delay problem caused by the cell handover, before the terminal device is handed over to the target cell, the source cell currently configures the measurement reporting of the neighboring cell, so that Radio Resource Control (RRC) reconfiguration is completed before the terminal device is handed over to the target cell, thereby eliminating the foregoing step 103 and step 104, shortening the delay of the cell handover, and further improving the data transmission quality.

However, physical layer-Reference Signal Receiving Power (L1-RSRP) reporting and Channel State Information (CSI) reporting in the current Rel-15/16 are related to the same serving cell. In this case, the base station needs to configure various possible L1-RSRP and CSI reportings through the RRC, so as to configure various possible L1-RSRP and CSI reportings when multiple neighboring cells need to be measured. That is, the base station needs to perform measurement reporting configuration for each cell that is to be possibly measured, so that when multiple cells need to be measured, measurement reporting configurations of a plurality of cells are generated, that is, multiple sets of measurement reporting configurations are generated, thereby generating a larger overhead.

It can be seen from the foregoing that an overhead of the cell measurement reporting in the current cell handover process is significant.

SUMMARY

Embodiments of the present disclosure provide an inter-cell measurement reporting method, a device, an apparatus, and a storage medium, so as to solve the problem in the prior art that cell measurement reporting overhead in a cell handover process is relatively large.

In a first aspect, an inter-cell measurement reporting method performed by a terminal device is provided. The method includes:

receiving measurement reporting configuration and indication information of one or more to-be-measured cells sent by a network device;

determining at least one to-be-measured cell according to the indication information;

measuring the at least one to-be-measured cell according to the measurement reporting configuration, to obtain a first measurement result; and reporting the first measurement result to the network device.

Optionally, before receiving the measurement reporting configuration and the indication information of the one or more to-be-measured cells sent by the network device, the method further includes:

measuring at least one predetermined cell to obtain a second measurement result;

reporting the second measurement result to the network device;

wherein the indication information is determined according to the second measurement result.

Optionally, the second measurement result is a Radio Resource Management (RRM) measurement result or a Synchronization Signal Block (SSB) measurement result.

Optionally, the measurement reporting configuration includes related information of one or more candidate to-be-measured cells, and the indication information is configured to indicate related information of the at least one to-be-measured cell in the measurement reporting configuration.

Optionally, the measurement reporting configuration includes at least one physical cell identifier of the one or more candidate to-be-measured cells, and the indication information is configured to indicate at least one physical cell identifier of the at least one to-be-measured cell in the measurement reporting configuration.

Optionally, the measurement reporting configuration includes at least one first identifier, the at least one first identifier is configured to identify at least one second measurement result, the at least one second measurement result is at least one measurement result of the one or more candidate to-be-measured cells measured by the terminal device before the terminal device receives the measurement reporting configuration and the indication information, and the indication information is configured to indicate at least one first identifier corresponding to the at least one to-be-measured cell in the measurement reporting configuration, determining the at least one to-be-measured cell according to the indication information includes:

determining the at least one first identifier indicated by the indication information as at least one target identifier; and determining at least one cell to which at least one second measurement result represented by the at least one target identifier belongs as the at least one to-be-measured cell.

Optionally, the measurement reporting configuration includes one or more reference signal resources of the one or more candidate to-be-measured cells, and the indication information is configured to indicate at least one reference signal resource of the at least one to-be-measured cell in the measurement reporting configuration, determining the at least one to-be-measured cell according to the indication information includes:

determining the at least one reference signal resource indicated by the indication information as at least one target reference signal resource;

determining at least one cell to which the at least one target reference signal resource belongs as the at least one to-be-measured cell.

Optionally, all reference signal resources configured for the terminal device are divided into at least one resource group, and each of the at least one resource group corresponds to one cell;

the measurement reporting configuration includes at least one identifier of at least one resource groups corresponding to the one or more candidate to-be-measured cells, and the indication information is configured to indicate at least one identifier of at least one resource group corresponding to the at least one to-be-measured cell in the measurement reporting configuration;

determining the at least one to-be-measured cell according to the indication information includes:

determining at least one identifier of at least one resource group indicated by the indication information as at least one target resource group identifier; and determining at least one cell corresponding to the at least one target resource group identifier as the at least one to-be-measured cell.

Optionally, all reference signal resources configured for the terminal device are divided into at least one resource group, and each resource group of the at least one resource group corresponds to one cell;

the measurement reporting configuration includes at least one first identifier configured for one resource group of the at least one resource group, the at least one first identifier is configured to identify at least one second measurement result, and the at least one second measurement result is at least one measurement result of the one or more candidate to-be-measured cells measured by the terminal device before the terminal device receives the measurement reporting configuration and the indication information, the indication information is configured to indicate at least one of the at least one first identifier corresponding to the at least one to-be-measured cell in the measurement reporting configuration;

determining the at least one to-be-measured cell according to the indication information includes:

determining at least one of the at least one first identifier indicated by the indication information as at least one target identifier;

determining the at least one cell to which the at least one second measurement result represented by the at least one target identifier belongs as the at least one to-be-measured cell.

Optionally, the indication information includes related information of a to-be-measured cell.

Optionally, all reference signal resources configured for the terminal device are divided into at least one resource group, and each resource group of the at least one resource group corresponds to one cell, the indication information includes at least one identifier of at least one resource group corresponding to the at least one to-be-measured cell;

determining the at least one to-be-measured cell according to the indication information includes:

determining the at least one cell corresponding to the at least one identifier of the at least one resource group included in the indication information as the at least one to-be-measured cell.

Optionally, the indication information includes at least one identifier of at least one third measurement result of the at least one to-be-measured cell, and the at least one third measurement result is at least one measurement result of the to-be-measured cell measured by the terminal device before the terminal device receives the measurement reporting configuration and the indication information;

determining the at least one to-be-measured cell according to the indication information includes:

determining the at least one cell to which the at least one third measurement result represented by the at least one identifier included in the indication information belongs as the at least one to-be-measured cell.

Optionally, measuring the at least one to-be-measured cell according to the measurement reporting configuration includes:

measuring one or more Synchronization Signal Blocks (SSBs) or one or more Channel State Information Reference Signals (CSI-RSs) of the at least one to-be-measured cell according to the measurement reporting configuration.

Optionally, the measurement reporting configuration includes transmission power information of at least one reference signal of at least one cell, and the transmission power information includes a transmission power value of a reference signal of a cell, or difference between a transmission power value of a reference signal of a cell and a transmission power value of a base reference signal.

In a second aspect, an inter-cell measurement reporting method performed by a network device is provided. The method includes:

sending measurement reporting configuration and indication information of at least one to-be-measured cell to a terminal device;

receiving a first measurement result sent by the terminal device, wherein the first measurement result is obtained after the terminal device measures the at least one to-be-measured cell according to the measurement reporting configuration and the indication information.

Optionally, before sending the measurement reporting configuration and the indication information of the at least one to-be-measured cell to the terminal device, the method further includes:

receiving at least one second measurement result sent by the terminal device, where the at least one second measurement result is obtained after the terminal device performs measurement on at least one predetermined cell;

determining the indication information according to the at least one second measurement result.

Optionally, the at least one second measurement result is a Radio Resource Management (RRM) measurement result or a Synchronization Signal Block (SSB) measurement result.

Optionally, the measurement reporting configuration includes related information of one or more candidate to-be-measured cells, and the indication information is configured to indicate related information of the at least one to-be-measured cell in the measurement reporting configuration.

Optionally, the measurement reporting configuration includes at least one physical cell identifier of the one or more candidate to-be-measured cells, and the indication information is configured to indicate at least one physical cell identifier of at least one to-be-measured cell in the measurement reporting configuration;

or, the measurement reporting configuration includes at least one first identifier, the at least one first identifier is configured to identify at least one second measurement result, the at least one second measurement result is at least one measurement result of the one or more candidate to-be-measured cells measured by the terminal device before the terminal device receives the measurement reporting configuration and the indication information, and the indication information is configured to indicate at least one first identifier corresponding to the at least one to-be-measured cell in the measurement reporting configuration;

or, the measurement reporting configuration includes one or more reference signal resources of the one or more candidate to-be-measured cells, and the indication information is configured to indicate at least one reference signal resource of the at least one to-be-measured cell in the measurement reporting configuration;

or, in a case that all reference signal resources configured for the terminal device are divided into at least one resource group and each resource group of the at least one resource group corresponds to one cell, the measurement reporting configuration includes one or more identifiers of one or more resource groups corresponding to the one or more candidate to-be-measured cells, and the indication information is configured to indicate at least one identifier of at least one resource group corresponding to at least one to-be-measured cell in the measurement reporting configuration;

or, in a case that all reference signal resources configured for the terminal device are divided into at least one resource group, and each resource group of the at least one resource group corresponds to one cell, the measurement reporting configuration includes at least one first identifier configured for one resource group of the at least one resource group, the first identifier is configured to identify at least one second measurement result, and the at least one second measurement result is at least one measurement result of the one or more candidate to-be-measured cells measured by the terminal device before the terminal device receives the measurement reporting configuration and the indication information, the indication information is configured to indicate at least one first identifier corresponding to at least one to-be-measured cell in the measurement reporting configuration.

Optionally, the indication information includes related information of the at least one to-be-measured cell.

Optionally, in a case that all reference signal resources configured for the terminal device are divided into at least one resource group and each resource group of the at least one resource group corresponds to one cell, the indication information includes at least one identifier of at least one resource group corresponding to the at least one to-be-measured cell; or the indication information includes at least one identifier of at least one third measurement result of at least one to-be-measured cell, and the at least one third measurement result is at least one measurement result of the at least one to-be-measured cell measured by the terminal device before the terminal device receives the measurement reporting configuration and the indication information.

In a third aspect, a terminal device is provided. The terminal device includes: a memory, a transceiver, and a processor, wherein the memory is configured to store a computer program, the transceiver is configured to transmit and receive data under control of the processor, the processor is configured to read a computer program in the memory and execute the following operations:

controlling the transceiver to receive measurement reporting configuration and indication information of one or more to-be-measured cells sent by a network device;

determining at least one to-be-measured cell according to the indication information;

measuring the at least one to-be-measured cell according to the measurement reporting configuration, to obtain a first measurement result;

controlling the transceiver to report the first measurement result to the network device.

In a fourth aspect, a network device is provided. The network device includes: a memory, a transceiver, and a processor, wherein the memory is configured to store a computer program, the transceiver is configured to send and receive data under a control of the processor, the processor is configured to read the computer program in the memory and execute the following operations:

controlling the transceiver to send measurement reporting configuration and indication information of at least one to-be-measured cell to a terminal device; and controlling the transceiver to receive a first measurement result sent by the terminal device, wherein the first measurement result is obtained after the terminal device measures the at least one to-be-measured cell according to the measurement reporting configuration and the indication information.

In a fifth aspect, an inter-cell measurement reporting apparatus applied to a terminal device is provided. The apparatus includes:

a first receiving module, configured to receive measurement reporting configuration and indication information of one or more to-be-measured cells sent by a network device;

a cell determining module, configured to determine at least one to-be-measured cell according to the indication information a first measurement module, configured to measure the at least one to-be-measured cell according to the measurement reporting configuration, to obtain a first measurement result;

a first sending module, configured to report the first measurement result to the network device.

In a sixth aspect, an inter-cell measurement reporting apparatus applied to a network device is provided. The apparatus includes:

a second sending module, configured to send measurement reporting configuration and indication information of at least one to-be-measured cell to a terminal device;

a second receiving module, configured to receive a first measurement result sent by the terminal device, wherein the first measurement result is obtained after the terminal device measures the at least one to-be-measured cell according to the measurement reporting configuration and the indication information.

In a seventh aspect, a processor-readable storage medium is provided. The processor-readable storage medium stores a computer program, and the computer program is configured to cause a processor to execute the inter-cell measurement reporting method according to the first aspect or the second aspect.

In an eighth aspect, a computer program is provided. The computer program includes computer readable codes, when the computer readable codes are executed on a computing processing device, the computing processing device is caused to perform the method according to the first aspect, or to perform the method according to the second aspect.

According to a ninth aspect, a computer-readable medium is provided. The computer-readable medium stores the computer program according to the eighth aspect.

In the embodiments of the present disclosure, the terminal device can receive the measurement reporting configuration and the indication information of the to-be-measured cell sent by the network device, determine the to-be-measured cell according to the indication information, and measure the to-be-measured cell according to the measurement reporting configuration to obtain the first measurement result, and then report the first measurement result to the network device. It can be seen therefrom that in the embodiments of the present disclosure, the network device configures a set of measurement reporting configurations for the terminal device, and dynamically indicates, by means of the indication information, which cell needs to be measured, that is, the indication information indicates which cell needs to be measured, and the set of measurement reporting configurations is used for measurement of the cell. Therefore, compared with the manner of respectively performing measurement reporting configurations for various cells that may be measured in the prior art, the embodiments of the present disclosure save signaling overheads.

The foregoing description is merely an overview of the technical solutions of the present disclosure, and in order to more clearly understand the technical means of the present disclosure, implementation can be performed according to the contents of the description, and in order to make the above and other objects, features and advantages of the present disclosure more comprehensible, specific embodiments of the present disclosure are specifically described below.

BRIEF DESCRIPTION OF THE DRAWINGS

In order to more clearly illustrate technical solutions of the embodiments of the present disclosure, the accompanying drawings that need to be used in the description of the embodiments of the present disclosure are briefly described below, and it is obvious that the drawings in the following description are merely some embodiments of the present disclosure, and other drawings may also be obtained by a person of ordinary skill in the art according to these drawings without paying creative labor.

DETAILED DESCRIPTION

Figure 1:
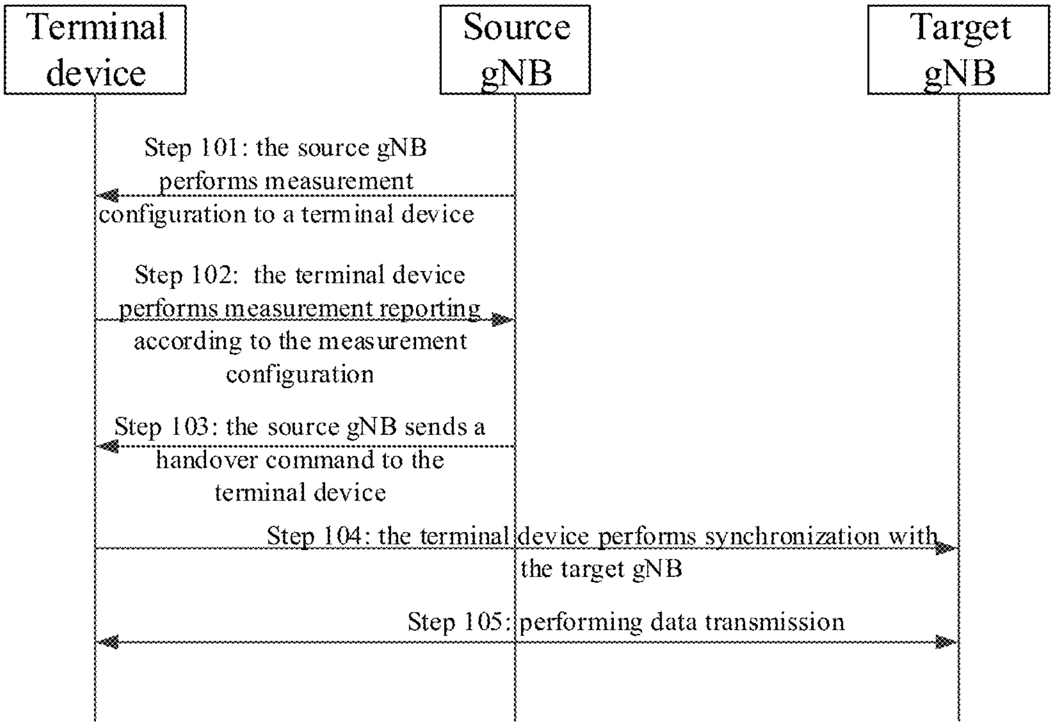
FIG. 1 is a schematic flowchart of a cell handover process in the prior art.

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. It is obvious that the described embodiments are only part, rather than all of the embodiments, of the present disclosure. All other embodiments obtained by a person of ordinary skill in the art based on the embodiments of the present disclosure without creative efforts shall fall within the protection scope of the present disclosure.

In the embodiments of the present disclosure, the term "and/or" describes an association relationship of associated objects, and indicates that there may be three relationships, for example, A and/or B may indicate that A exists alone, A and B exist at the same time, and B exists alone. The character "/" generally indicates that the associated objects have a "or" relationship.

In the embodiments of the present disclosure, the term "a plurality of" means two or more, and the other quantifiers are similar to the term.

The technical solutions in the embodiments of the present disclosure will be clearly and completely described below with reference to the accompanying drawings in the embodiments of the present disclosure. Obviously, the described embodiments are merely some, rather than all, of the embodiments of the present disclosure. All other embodiments obtained by a person of ordinary skill in the art based on the embodiments of the present disclosure without creative efforts shall fall within the protection scope of the present disclosure.

Embodiments of the present disclosure provide an inter-cell measurement reporting method, a device and an apparatus, and a storage medium, so as to solve the problem that the cell measurement reporting overhead in the current cell handover process is large.

The method and the apparatus are based on the same application concept, and the implementations of the apparatus and the method may be obtained by referring to each other since principles of the method and the apparatus for solving the problem are similar, and details are not described herein again.

In addition, the technical solutions provided in the embodiments of the present disclosure may be applicable to various systems, especially 5G systems. For example, the applicable system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) System, a 5G New Radio (NR) System, etc. Each system includes a terminal device and a network device. The systems may further include a core network portion, such as an Evolved Packet System (EPS), a 5G system (5 GS), etc.

The terminal device according to the embodiments of the present disclosure may be a device that provides voice and/or data connectivity to a user, a handheld device having a wireless connection function, or other processing devices connected to a wireless modem, etc. In different systems, names of the terminal device may also be different, for example, in a 5G system, the terminal device may be referred to as a User Equipment (UE). A wireless terminal device may communicate with one or more Core Networks (CN) via a Radio Access Network (RAN). The wireless terminal device may be a mobile terminal device, such as a mobile phone (or referred to as a "cellular" phone) and a computer with a mobile terminal device, for example, may be a portable device, or a pocket device, or a handheld device, or a computer built-in device or a vehicle-mounted mobile device that exchanges language and/or data with the radio access network. For example, devices such as a Personal Communication Service (PCS) phone, a cordless telephone, a Session Initiated Protocol (SIP) phone, a Wireless Local Loop (WLL) station, a Personal Digital Assistant (PDA), etc. The wireless terminal device may also be referred to as a system, a subscriber unit, a subscriber station, a mobile station, a mobile, a remote station, an access point, a remote terminal, an access terminal, a user terminal, a user agent, and a user device, which are not limited in the embodiments of the present disclosure.

The network devices involved in the embodiments of the present disclosure may be a base station, and the base station may include a plurality of cells that provide services for the terminal. According to different specific application occasions, a base station may also be referred to as an access point, or may be a device in an access network that communicates with a wireless terminal device through one or more sectors on an air interface, or other names. The network device may be configured to transform a received air frame with an Internet Protocol (IP) packet to serve as a router between the wireless terminal device and the remaining portion of the access network, wherein the remaining portion of the access network may include an Internet Protocol (IP) communication network. The network device may also coordinate attribute management of the air interface. For example, the network device involved in the embodiments of the present disclosure may be a network device (Base Transceiver Station, BTS) in a Global System for Mobile Communications (GSM) or a Code Division Multiple Access (CDMA) system, or may be a network device (Node B) in a Wide-Band Code Division Multiple Access (WCDMA) system, or an evolved network device (evolutional Node B, eNB or e-Node B) in a long term evolution (LTE) system, a 5G base station in 5G network architecture (a next generation system), or a home evolved Node B (HeNB), a relay node, a home base station (Femto), a Pico base station (pico), etc., which are not limited in the embodiments of the present disclosure. In some network structures, the network device may include a centralized unit (CU) node and a distributed unit (DU) node, and the centralized unit and the distribution unit may also be geographically separated.

Multi Input Multi Output (MIMO) transmission may be performed between the network device and the terminal device by using one or more antennas, and the MIMO transmission may be Single User MIMO (SU-MIMO) or Multiple User MIMO (Multiple User MIMO, MU-MIMO). According to the form and the quantity of root antenna combinations, the MIMO transmission may be 2D-MIMO, 3D-MIMO, FD-MIMO, or massive-MIMO, or may be diversity transmission or precoding transmission or beamforming transmission, etc.

Figure 2:
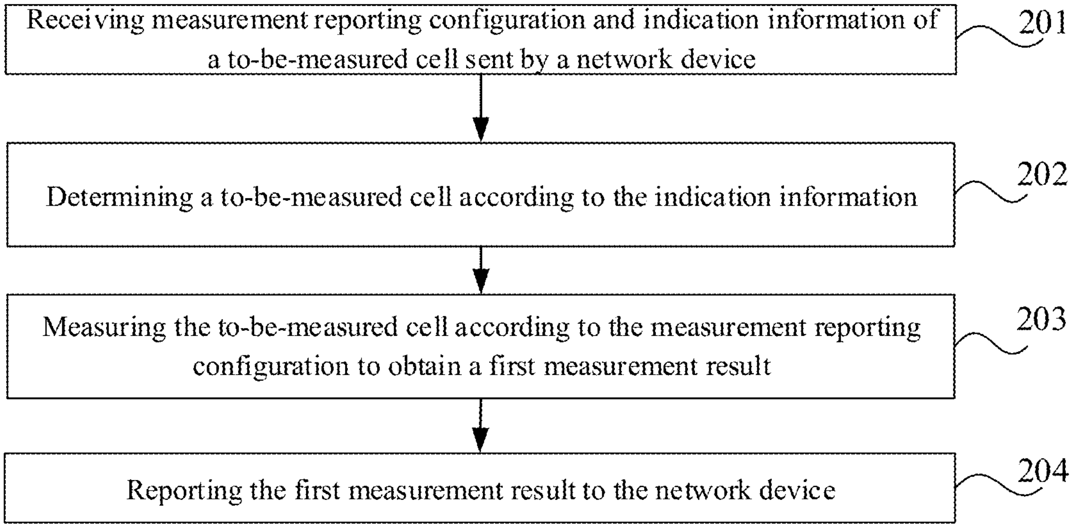
FIG. 2 is a flowchart of a method of reporting inter-cell measurement according to some embodiments of the present disclosure.

FIG. 2 is a schematic flowchart of an inter-cell measurement reporting method according to some embodiments of the present disclosure. The method is performed by a terminal device, and as shown in FIG. 2, the method may include the following steps 201 to 204.

Step 201: receiving measurement reporting configuration and indication information of a to-be-measured cell sent by a network device.

The measurement reporting configuration includes an object to be measured (i.e. which reference signal needs to be measured, such as an SSB or a CSI-RS), a parameter (such as RSRP) that needs to be measured, and content that needs to be reported to the network device.

In addition, the measurement reporting configuration does not indicate a cell to which the measurement reporting configuration is related, the cell to which the measurement reporting configuration is related is indicated by the indication information, that is, the indication information indicates which cell needs to be measured, and the measurement reporting configuration is used for measurement of the cell.

The measurement reporting configuration and the indication information may be separately sent by the network device to the terminal device, or may be sent to the terminal device by the network device.

Optionally, the indication information is sent by the network device to the terminal device through a Media Access Control Control Unit (MAC-CE) signaling or Downlink Control Information (DCI) signaling.

In addition, the network device may be a source base station in a cell handover process.

Step 202: determining a to-be-measured cell according to the indication information.

Step 203: measuring the to-be-measured cell according to the measurement reporting configuration to obtain a first measurement result.

According to the measurement reporting configuration, which reference signals and which parameters of the to-be-measured cell need to be measured can be determined, and which content needs to be reported to the network device can be determined, thereby generating the first measurement result.

Step 204: reporting the first measurement result to the network device.

In the embodiments of the present disclosure, it can be known from the above steps 201-204 that the terminal device can receive the measurement reporting configuration and the indication information of the to-be-measured cell sent by the network device, so that the terminal device can determine the to-be-measured cell according to the indication information, and measure the to-be-measured cell according to the measurement reporting configuration, to obtain the first measurement result, and then report the first measurement result to the network device. It can be seen therefrom that in the embodiments of the present disclosure, the network device configures a set of measurement reporting configurations for the terminal device, and dynamically indicates, by means of the indication information, the cell that needs to be measured, that is, the indication information indicates which cell needs to be measured, and the set of measurement reporting configurations is used for measurement of this cell. Therefore, compared with the manner of respectively performing measurement reporting configurations for various cells that may be measured in the prior art, the embodiments of the present disclosure save signaling overheads.

Optionally, before the receiving the measurement reporting configuration and the indication information of the to-be-measured cell sent by the network device, the method further includes:

measuring a plurality of predetermined cells to obtain a second measurement result;

reporting the second measurement result to the network device;

wherein the indication information is determined according to the second measurement result.

In addition, a measurement object and a measurement parameter of the second measurement result may be the same as or different from the measurement object and the measurement parameter of the first measurement result. For example, the second measurement result may be the RSRP of the SSB, and the second measurement result may be the RSRP of the SSB or the RSRP of the CSI-RS.

Hence, the network device may determine the cell that needs to be measured this time according to the measurement result most recently reported by the terminal device.

It may be understood that the method for determining the indication information, that is, the method for determining the cell that needs to be measured this time is not limited to determining according to the second measurement result, for example, the cell closest to the terminal device may also be considered as the to-be-measured cell according to network deployment.

Optionally, the second measurement result is a mobility management (Radio Resource Management (RRM)) measurement result or a Synchronization Signal Block (SSB) measurement result.

That is, the network device may determine the cell that needs to be measured this time according to the RRM measurement result or the SSB measurement result.

Optionally, the measurement reporting configuration includes related information of at least one candidate to-be-measured cell, and the indication information is configured to indicate the related information of the to-be-measured cell in the measurement reporting configuration.

For example, the measurement reporting configuration includes related information of three candidate to-be-measured cells A, B, and C, and the indication information indicates the related information of the second candidate to-be-measured cell in the measurement reporting configuration, the cell B needs to be measured.

The related information of at least one candidate to-be-measured cell included in the measurement reporting configuration may be represented in the form of an information field, for example, one information field represents related information of one candidate to-be-measured cell, and then the measurement reporting configuration includes M information fields, indicating that the measurement reporting configuration includes related information of M candidate to-be-measured cells. The indication information may indicate at least one of the M information fields.

It can be seen therefrom that in the embodiments of the present disclosure, related information of at least one candidate to-be-measured cell may be included in the measurement reporting configuration, and then the indication information indicates which cell or which cells in the cells need to be measured.

Optionally, the measurement reporting configuration includes a physical cell identifier of at least one candidate to-be-measured cell, and the indication information is configured to indicate a physical cell identifier of a to-be-measured cell in the measurement reporting configuration.

For example, the measurement reporting configuration includes a PCI1, a PCI2, and a PCI3, and the indication information indicates a second PCI in the measurement reporting configuration, and the cell represented by the PCI2 needs to be measured. The PCI represents a physical cell identifier.

It can be seen therefrom that in the embodiments of the present disclosure, at least one PCI of the at least one cell may be included in the measurement reporting configuration, and then the indication information indicates a cell represented by a PCI of the at least one PCI or cells represented by PCIs of the at least one PCI need to be measured.

Optionally, the measurement reporting configuration includes at least one first identifier, the first identifier is used to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration;

determining the to-be-measured cell according to the indication information includes:

determining the first identifier indicated by the indication information as a target identifier; and determining the cell to which the second measurement result represented by the target identifier belongs as the to-be-measured cell.

The first identifier may be an index of a second measurement result. The second measurement result is an RRM measurement result or an SSB measurement result.

For example, the measurement reporting configuration includes three first identifiers X1, X2, and X3, and the indication information indicates a second one of the first identifiers in the measurement reporting configuration, and a cell to which the second measurement result represented by X2 belongs needs to be measured.

It can be seen therefrom that in the embodiments of the present disclosure, at least one first identifier (i.e. the identifiers of the second measurement results) may be included in the measurement reporting configuration, and then the indication information indicates which one of the first identifiers or which ones of the first identifiers correspond to the cells to be measured.

Optionally, the measurement reporting configuration includes one or more reference signal resources of one or more candidate to-be-measured cells, and the indication information is configured to indicate a reference signal resource of a to-be-measured cell in the measurement reporting configuration;

determining the to-be-measured cell according to the indication information includes:

determining a reference signal resource indicated by the indication information as a target reference signal resource;

determining a cell to which the target reference signal resource belongs as the to-be-measured cell.

The candidate to-be-measured cells may include cells to which all reference signal resources configured for the terminal device belong, that is, the measurement reporting configuration may include all reference signal resources configured for the terminal device.

For example, all reference signal resources configured for the terminal device include Y1, Y2, and Y3, and the measurement reporting configuration includes Y1, Y2, and Y3, and the indication information indicates that the second reference signal resource in the measurement reporting configuration, then the cell to which Y2 belongs needs to be measured.

In the embodiments of the present disclosure, reference signal resources configured for the terminal device respectively have corresponding cells, that is, the reference signal resources are allocated to the cells. Therefore, after determining the reference signal resource included in the measurement reporting configuration and indicated by the indication information, the cell to which the reference signal resource belongs may be determined, and then the cell may be considered as the to-be-measured cell.

Optionally, all reference signal resources configured for the terminal device are divided into at least one resource group, and each resource group corresponds to one cell. The measurement reporting configuration includes identifiers of the resource groups corresponding to the candidate to-be-measured cells, and the indication information is configured to indicate an identifier of a resource group corresponding to a to-be-measured cell in the measurement reporting configuration;

determining the to-be-measured cell according to the indication information includes:

determining an identifier of a resource group indicated by the indication information as a target resource group identifier; and determining a cell corresponding to the target resource group identifier as the to-be-measured cell.

The identifier of the resource group may be a PCI of a cell corresponding to the resource group, or an index of the resource group.

For example, all reference signal resources configured for the terminal device are divided into three resource groups Z1, Z2, and Z3, and the measurement reporting configuration includes indexes Z1, Z2, and Z3, and the indication information indicates the index of the second resource group in the measurement reporting configuration, then the cell corresponding to Z2 needs to be measured.

It can be known from above that in some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the measurement reporting configuration may include at least one resource group identifier, and then the indication information indicates at least one resource group identifier therein, so that the cell corresponding to the resource group identifier indicated by the indication information can be considered as the to-be-measured cell.

Optionally, all reference signal resources configured for the terminal device are divided into at least one resource group, and each resource group corresponds to one cell. The measurement reporting configuration includes at least one first identifier configured for a resource group, the first identifier is used to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration;

determining a to-be-measured cell according to the indication information includes:

determining a first identifier indicated by the indication information as a target identifier;

determining the cell to which the second measurement result represented by the target identifier belongs as the to-be-measured cell.

For example, all reference signal resources configured for the terminal device are divided into three resource groups Z1, Z2, and Z3, and then the measurement reporting configuration may include at least one first identifier configured for one of the three resource groups. For example, the first identifiers configured for the resource group Z2 are X4, X5, and X6, then three first identifiers X4, X5, and X6 may be included in the measurement reporting configuration, and the indication information may indicate the index of the second resource group in the measurement reporting configuration, and then the cell to which the second measurement result represented by X5 belongs needs to be measured.

In some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the measurement reporting configuration may include at least one first identifier configured for at least one of the resource groups, and then the indication information indicates at least one of the at least one first identifier, so that the cell to which the second measurement result represented by the first identifier indicated by the indication information belongs may be considered as the to-be-measured cell.

Optionally, the indication information includes related information of a to-be-measured cell.

It can be seen therefrom that in the embodiments of the present disclosure, the indication information may include related information of a to-be-measured cell, and after receiving the indication information, the terminal device may directly determine the to-be-measured cell according to the indication information.

Optionally, all reference signal resources configured for the terminal device are divided into at least one resource group, and each resource group corresponds to one cell. The indication information includes an identifier of a resource group corresponding to a to-be-measured cell;

determining a to-be-measured cell according to the indication information includes:

determining the cell corresponding to the identifier of the resource group included in the indication information as the to-be-measured cell.

The identifier of the resource group may be a PCI of a cell corresponding to the resource group, or an index of the resource group.

For example, all reference signal resources configured for the terminal device are divided into three resource groups Z1, Z2, and Z3, and the indication information includes the index of Z2, and then the cell corresponding to Z2 needs to be measured.

In some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the indication information may include at least one resource group identifier, so that the terminal device directly considers the cell corresponding to the resource group identifier included in the indication information as the to-be-measured cell.

Optionally, the indication information includes an identifier of a third measurement result of a to-be-measured cell, and the third measurement result is a measurement result of the to-be-measured cell measured by the terminal device before the terminal device receives the measurement reporting configuration and the indication information;

determining a to-be-measured cell according to the indication information includes:

determining the cell to which the third measurement result represented by the identifier included in the indication information belongs as the to-be-measured cell.

The third measurement result is an RRM measurement result or an SSB measurement result. The identifier of the third measurement result may be the index of the third measurement result.

Therefore, in the embodiments of the present disclosure, the terminal device may directly take the cell to which the third measurement result represented by the identifier included in the indication information belongs as the to-be-measured cell.

Optionally, the measuring the to-be-measured cell according to the measurement reporting configuration includes:

measuring a Synchronization Signal Block (SSB) or a Channel State Information Reference Signal (CSI-RS) of the to-be-measured cell according to the measurement reporting configuration.

Hence, the terminal device may measure the SSB or the CSI-RS of the to-be-measured cell. It may be understood that the terminal device may further measure other reference signals of the to-be-measured cell, and is not limited to the SSB and the CSI-RS.

Optionally, the measurement reporting configuration includes transmission power information of the reference signal of the at least one cell, and the transmission power information includes a transmission power value of the reference signal of the cell, or difference between the transmission power value of the reference signal of the cell and the transmission power value of a base reference signal.

The network device may configure a corresponding transmission power for a reference signal (for example, an SSB or a CSI-RS) of each cell. In this way, even if the transmission powers of the reference signals of different cells are different, the network device sends to the terminal device the measurement reporting configuration which carries the transmission power information of the reference signal of the at least one cell, and the terminal device may also determine the path losses corresponding to the different reference signals according to the transmission power information carried in the measurement reporting configuration and the reference signal receiving power of the terminal device, so as to determine the optimal measurement result of the L1-RSRP. The path loss is equal to the difference between the transmission power and the receiving power of the reference signal.

Optionally, the base reference signal is predetermined, or is configured by the network device, or is indicated by the terminal device to the network device.

Figure 3:
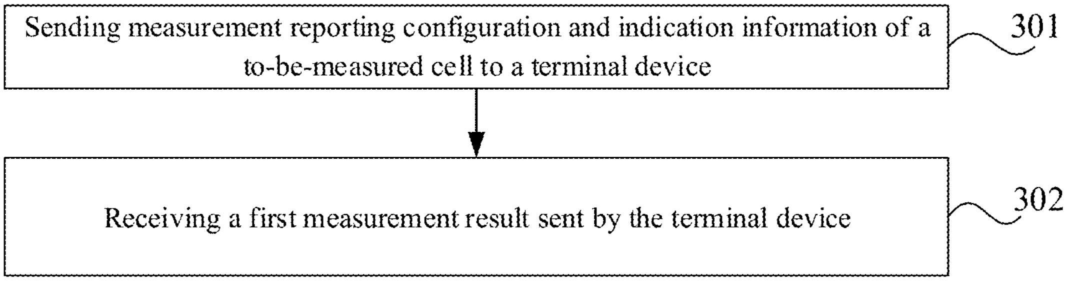
FIG. 3 is a flowchart of another inter-cell measurement reporting method according to some embodiments of the present disclosure.

FIG. 3 is a schematic flowchart of another inter-cell measurement reporting method provided by an embodiment of the present disclosure. The method is performed by a network device, and the network device may be a source base station in a cell handover process. As shown in FIG. 3, the method may include the following steps 301 to 302.

Step 301: sending measurement reporting configuration and indication information of a to-be-measured cell to a terminal device.

The measurement reporting configuration includes an object to be measured (i.e. which reference signal needs to be measured, such as an SSB or a CSI-RS), a parameter (such as a Reference Signal Receiving Power (RSRP)) that needs to be measured, and content that needs to be reported to the network device.

In addition, the measurement reporting configuration does not indicate a cell to which the measurement reporting configuration is related, the cell to which the measurement reporting configuration is related is indicated by the indication information, that is, the indication information indicates which cell needs to be measured, and the measurement reporting configuration is used for measurement of the cell.

The measurement reporting configuration and the indication information may be separately sent by the network device to the terminal device, or may be sent together to the terminal device by the network device.

Optionally, the indication information is sent to the terminal device by the network device through the MAC-CE signaling or the DCI signaling.

Step 302: receiving a first measurement result sent by the terminal device.

The first measurement result is obtained after the terminal device measures a to-be-measured cell according to the measurement reporting configuration and the indication information.

It can be known from the above steps 301-302 that, in the embodiments of the present disclosure, the terminal device can receive the measurement reporting configuration and the indication information of the to-be-measured cell sent by the network device, determine the to-be-measured cell according to the indication information, and measure the to-be-measured cell according to the measurement reporting configuration to obtain the first measurement result, and then report the first measurement result to the network device. It can be seen therefrom that in the embodiments of the present disclosure, the network device configures a set of measurement reporting configurations for the terminal device, and dynamically indicates, by means of the indication information, which cell needs to be measured, that is, the indication information indicates which cell needs to be measured, and the set of measurement reporting configurations is used for measurement of the cell. Therefore, compared with the manner of respectively performing measurement reporting configurations for various cells that may be measured in the prior art, the embodiments of the present disclosure save signaling overheads.

Optionally, before the sending the measurement reporting configuration and the indication information of the to-be-measured cell to the terminal device, the method further includes:

- receiving a second measurement result sent by the terminal device, where the second measurement result is obtained after the terminal device performs measurement on at least one predetermined cell;
- determining the indication information according to the second measurement result.

In addition, a measurement object and a measurement parameter of the second measurement result may be the same as or different from the measurement object and the measurement parameter of the first measurement result. For example, the second measurement result may be the RSRP of the SSB, and the second measurement result may be the RSRP of the SSB or the RSRP of the CSI-RS.

Hence, the network device may determine the cell that needs to be measured this time according to the measurement result most recently reported by the terminal device.

It may be understood that the method for determining the indication information, that is, the method for determining the cell that needs to be measured this time, is not limited to determining according to the second measurement result, for example, the cell closest to the terminal device may also be considered as the to-be-measured cell according to the network deployment.

Optionally, the second measurement result is a mobility management (Radio Resource Management (RRM)) measurement result or a Synchronization Signal Block (SSB) measurement result.

That is, the network device may determine the cell that needs to be measured this time according to the RRM measurement result or the SSB measurement result.

Optionally, the measurement reporting configuration includes related information of at least one candidate to-be-measured cell, and the indication information is configured to indicate the related information of the to-be-measured cell in the measurement reporting configuration.

For example, the measurement reporting configuration includes related information of three candidate to-be-measured cells A, B, and C, and the indication information indicates the related information of the second candidate to-be-measured cell in the measurement reporting configuration, the cell B needs to be measured.

The related information of at least one candidate to-be-measured cell included in the measurement reporting configuration may be represented in the form of an information field, for example, one information field represents related information of one candidate to-be-measured cell, and then the measurement reporting configuration includes M information fields, indicating that the measurement reporting configuration includes related information of M candidate to-be-measured cells. The indication information may indicate at least one of the M information fields.

It can be seen therefrom that in the embodiments of the present disclosure, related information of at least one candidate to-be-measured cell may be included in the measurement reporting configuration, and then the indication information indicates which cell or which cells in the cells need to be measured.

Optionally, the measurement reporting configuration includes a physical cell identifier of at least one candidate to-be-measured cell, and the indication information is configured to indicate a physical cell identifier of a to-be-measured cell in the measurement reporting configuration.

For example, the measurement reporting configuration includes a PCI1, a PCI2, and a PCI3, and the indication information indicates a second PCI in the measurement reporting configuration, and the cell represented by the PCI2 needs to be measured. The PCI represents a physical cell identifier.

It can be seen therefrom that in the embodiments of the present disclosure, at least one PCI of the at least one cell may be included in the measurement reporting configuration, and then the indication information indicates a cell represented by a PCI of the at least one PCI or cells represented by PCIs of the at least one PCI need to be measured.

Optionally, the measurement reporting configuration includes at least one first identifier, the first identifier is used to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration.

The first identifier may be an index of a second measurement result. The second measurement result is an RRM measurement result or an SSB measurement result.

For example, the measurement reporting configuration includes three first identifiers X1, X2, and X3, and the indication information indicates a second one of the first identifiers in the measurement reporting configuration, and a cell to which the second measurement result represented by X2 belongs needs to be measured.

It can be seen therefrom that in the embodiments of the present disclosure, at least one first identifier (i.e. the identifiers of the second measurement results) may be included in the measurement reporting configuration, and then the indication information indicates which cell corresponding to a first identifier indicated by the indication information or which cells corresponding to first identifiers indicated by the indication information need to be measured.

Optionally, the measurement reporting configuration includes one or more reference signal resources of one or more candidate to-be-measured cells, and the indication information is configured to indicate a reference signal resource of a to-be-measured cell in the measurement reporting configuration.

For example, all reference signal resources configured for the terminal device include Y1, Y2, and Y3, and the measurement reporting configuration includes Y1, Y2, and Y3, and the indication information indicates that the second reference signal resource in the measurement reporting configuration then the cell to which Y2 belongs needs to be measured.

In the embodiments of the present disclosure, reference signal resources configured for the terminal device respectively have corresponding cells, that is, the reference signal resources are allocated to the cells. Therefore, after determining the reference signal resource included in the measurement reporting configuration and indicated by the indication information, the cell to which the reference signal resource belongs may be determined, and then the cell may be considered as the to-be-measured cell.

Optionally, all reference signal resources configured for the terminal device are divided into at least one resource group, and each resource group corresponds to one cell. The measurement reporting configuration includes identifiers of the resource groups corresponding to the candidate to-be-measured cells, and the indication information is configured to indicate an identifier of a resource group corresponding to a to-be-measured cell in the measurement reporting configuration.

The identifier of the resource group may be a PCI of a cell corresponding to the resource group, or an index of the resource group.

For example, all reference signal resources configured for the terminal device are divided into three resource groups Z1, Z2, and Z3, and the measurement reporting configuration includes indexes Z1, Z2, and Z3, and the indication information indicates the index of the second resource group in the measurement reporting configuration, then the cell corresponding to Z2 needs to be measured.

It can be known from above that in some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the measurement reporting configuration may include at least one resource group identifier, and then the indication information indicates at least one resource group identifier therein, so that the cell corresponding to the resource group identifier indicated by the indication information can be considered as the to-be-measured cell.

Optionally, all reference signal resources configured for the terminal device are divided into at least one resource group, and each resource group corresponds to one cell. The measurement reporting configuration includes at least one first identifier configured for a resource group, the first identifier is used to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration.

For example, all reference signal resources configured for the terminal device are divided into three resource groups Z1, Z2, and Z3, and then the measurement reporting configuration may include at least one first identifier configured for one of the three resource groups. For example, the first identifiers configured for the resource group Z2 are X4, X5, and X6, then three first identifiers X4, X5, and X6 may be included in the measurement reporting configuration, and the indication information may indicate the index of the second resource group in the measurement reporting configuration, and then the cell to which the second measurement result represented by X5 belongs needs to be measured.

It can be known therefrom that, in some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the measurement reporting configuration may include at least one first identifier configured for at least one of the resource groups, and then the indication information indicates at least one of the at least one first identifier, so that the cell to which the second measurement result represented by the first identifier indicated by the indication information belongs may be considered as the to-be-measured cell.

Optionally, the indication information includes related information of a to-be-measured cell.

It can be seen therefrom that in the embodiments of the present disclosure, the indication information may include related information of a to-be-measured cell, and after receiving the indication information, the terminal device may directly determine the to-be-measured cell according to the indication information.

Optionally, all reference signal resources configured for the terminal device are divided into at least one resource group, and each resource group corresponds to one cell. The indication information includes an identifier of a resource group corresponding to a to-be-measured cell.

The identifier of the resource group may be a PCI of a cell corresponding to the resource group, or an index of the resource group.

For example, all reference signal resources configured for the terminal device are divided into three resource groups Z1, Z2, and Z3, and the indication information includes the index of Z2, and then the cell corresponding to Z2 needs to be measured.

It can be known therefrom that, in some embodiments of the present disclosure, reference signal resources configured for the terminal device may also be divided into at least one resource group, and one resource group corresponds to one cell, that is, the reference signal resources allocated to the same cell belong to the same resource group. Moreover, in this case, the indication information may include at least one resource group identifier, so that the terminal device directly considers the cell corresponding to the resource group identifier included in the indication information as the to-be-measured cell.

Optionally, the indication information includes an identifier of a third measurement result of a to-be-measured cell, and the third measurement result is a measurement result of the to-be-measured cell measured by the terminal device before the terminal device receives the measurement reporting configuration and the indication information.

The measurement result represented by the identifier included in the indication information is an RRM measurement result or an SSB measurement result. The identifier may be an index of the measurement result.

It can be seen therefrom that in the embodiments of the present disclosure, the terminal device may directly take the cell to which the third measurement result represented by the identifier included in the indication information belongs as the to-be-measured cell.

As an illustrative explanation, specific embodiments of the inter-cell measurement reporting methods provided in the embodiments of the present disclosure may be specifically described in following Embodiments 1 to 4.

Embodiment 1

The network device configures for the terminal device one measurement reporting configuration, indicated as Report Setting0, which is associated with a Resource Setting, the Resource Setting includes two resource sets which are respectively represented as a resource set 0 and a resource set 1, each resource set includes a group of SSBs, and one group of SSBs corresponds to one cell.

In the measurement reporting configuration, that is, the Report Setting 0, a cell identifier information field is configured for each resource set. Each cell identifier information field includes M=5 identifiers. The cell identifier information field configured for the resource set 0 is shown in Table 1 below, and the cell identifier information field configured for the resource set 1 is shown in Table 2 below. That is, the measurement reporting configuration includes PCIs of candidate to-be-measured cells configured for the resource sets.

Table 1 is a cell identifier information filed configured for the resource set 0.

| | | | | |
|---|---|---|---|---|
| PCI0 | PCI3 | PCI4 | PCI6 | PCI7 |

Table 2 is a cell identifier information filed configured for the resource set 1.

| | | | | |
|---|---|---|---|---|
| PCI2 | PCI12 | PCI7 | PCI8 | PCI15 |

The terminal device may measure the SSBs of different cells according to the mobility management (RRM) configuration of the network device, and periodically reports the measurement results of the RRM, where the measurement results of the RRM include the RSRP values of the SSBs of the cells. The network device may select the to-be-measured cell from the cells represented by the PCIs included in the Report Setting 0 according to the RSRP values of SSBs of the cells in the RRM measurement results. For example, if the RSRP values of the SSBs of the cells represented by the PCI 3 and the PCI 7 in the RRM measurement results are the highest, the network device may determine that the PCI 3 and the PCI 7 need to be activated (i.e. the cells represented by the PCI 3 and the PCI 7 need to be measured), and the network device instructs the terminal device to activate the PCI 3 in the resource set 0 and the PCI 7 in the resource set 1 through the indication information. The terminal device receives the Report setting 0 and the indication information, and the cells represented by the PCI 3 and the PCI 7 may be measured and measurement results may be reported.

After the terminal device receives the Report setting 0 and the indication information, the terminal device may measure the SSBs of the cells represented by the PCI 3 and the PCI 7 and report the measurement report, or may measure other reference signals and report the measurement report. In this case, each resource set includes a corresponding reference signal. Specifically, which reference signal needs to be measured and reported is indicated by the network device.

In addition, the indication information may be a Media Access Control Control Unit (MAC-CE) signaling or a Downlink Control Information (DCI) signaling.

Embodiment 2

The network device configures for the terminal device one measurement reporting configuration represented as Report Setting 0. The one measurement reporting configuration is associated with one Resource setting, where the Resource setting includes two resource sets, which are respectively represented as a resource set 0 and a resource set 1. Each resource set includes a group of SSBs, and one group of SSBs corresponds to one cell.

In the measurement reporting configuration, i.e., Report Setting 0, a cell identifier information field is configured for each resource set. Each cell identifier information field includes M=5 identifiers. The cell identifier information field configured for the resource set 0 is shown in Table 3 below, and the cell identifier information field configured for the resource set 1 is shown in Table 4 below.

Table 3 is a cell identifier information filed configured for the resource set 0.

| | | | | |
|---|---|---|---|---|
| R0 | R1 | R2 | R3 | R4 |

Table 4 is a cell identifier information filed configured for the resource set 1.

| | | | | |
|---|---|---|---|---|
| R0 | R1 | R2 | R3 | R4 |

Ri is used to identify the i-th measurement result in the M results in the measurement result reported by the terminal device to the network device. The measurement results may be results of RRM measurement, or measurement results related to other beam management. For example, if it is pre-defined that first M RSRP values in the RRM measurement results corresponding to the cell identifier information fields are selected, then R0~R (M−1) are used to identify the first M RSRP values of the RRM measurement results. In this way, R0~R (M−1) have one-to-one correspondence to cell indexes corresponding to the first M RSRP values of the RRM measurement result. R0~R (M−1) may be indexes of the measurement result.

For example, in the RRM measurement result, 5 cells with the largest RSRP values are respectively:

{RSRP0,PCI1}, {RSRP1,PCI6}, {RSRP2,PCI8}, {RSRP3,PCI10}, {RSRP4,PCI21};

it may be pre-defined that the first M cells with the maximum RSRP values in the RRM measurement result correspond to the cell identifier information fields, then R0~R (M−1) are used to identify the first M cells with the maximum RSRP values of the RRM measurement result.

The network device may determine which cell is activated according to the RRM measurement result, for example, determine to activate the cells represented by the PCI6 and the PCI21, and the network device may indicate the R1 in the resource set 0 and the R4 in the resource set 1 through the indication information. The terminal device receives the Report setting 0 and the indication information, and determines that the measurement results indicated by the indication information are related to R1 and R4, so that the cells to which R1 and R4 belong, i.e. the cells represented by the PCI6 and the PCI21, may be measured and the measurement result may be reported.

After the terminal device receives the Report setting 0 and the indication information, the terminal device may measure the SSBs of the cells represented by the PCI6 and the PCI21 and reports the measurement result, or may measure other reference signals and report the measurement result. In this case, each resource set includes a corresponding reference signal. Specifically, which reference signal needs to be measured and reported is indicated by the network device.

In addition, the indication information may be MAC-CE signaling or DCI signaling.

Embodiment 3

The network device groups CSI-RS resources to be measured, for example, into K groups. Each resource group corresponds to one cell, and each resource group includes a plurality of CSI-RS resources.

The network device configures for the terminal device one measurement reporting configuration, the measurement reporting configuration is represented as Report Setting0, which is associated with a Resource setting. The Resource setting includes K resource sets, and each resource set corresponds to one CSI-RS resource group.

The terminal device reports the RSRPs of measured SSBs of the N cells according to measurement of the SSBs of a plurality of cells. The network device may determine an optimal cell according to a result of the reporting (i.e. select a cell with the maximum RSRP value), and perform channel measurement. The optimal cell corresponds to one of the K resource sets. Therefore, one of the K groups can be directly indicated by the indication information, or PCI information of one of the K groups is directly indicated by the indication information, so that the terminal device determines the to-be-measured cell according to the indication information, and then measures the CSI-RSs of the cell and reports the measurement result.

Embodiment 4

The network device groups CSI-RS resources to be measured, for example, into K groups. Each resource group corresponds to one cell, and each resource group includes a plurality of CSI-RS resources.

The network device configures one measurement reporting configuration for the terminal device, the one measurement reporting configuration is represented by Report Setting0 which is associated with one Resource setting. The Resource setting includes one resource set, that is, resource set 0, which corresponds to one CSI-RS resource group. CSI-RS resources in the CSI-RS resource group are sequentially numbered as CSI-RS 0, CSI-RS 1, . . . , and so on.

In the measurement reporting configuration, that is, in the Report Setting 0, a cell identifier information field is configured for a resource set 0. The cell identifier information field includes M=5 identifiers.

In a first aspect, the cell identifier information field configured for the resource set 0 may be shown in Table 5 below.

Table 5 is a cell identifier information filed configured for the resource set 0.

| G0 | G1 | G2 | G3 | G4 |
|---|---|---|---|---|

The network device may select an optimal measurement result according to the SSB measurement results reported by the terminal device, so as to indicate the resource group corresponding to the cell corresponding to the optimal measurement result to the terminal device. For example, if the resource group is G2, then the network device may indicate G2 in the resource set0 through the indication information. The terminal device receives the Report setting 0 and the indication information, and determines that the indication information indicates the G2, and may measure the CSI-RSs of the cell corresponding to the G2 and report the measurement result.

In a second aspect, the cell identifier information field configured for the resource set 0 may also be shown in Table 6 below.

Table 6 is a cell identifier information filed configured for the resource set 0.

| G0 | G1 | G2 | G3 | G4 |
|---|---|---|---|---|

The Ri is used to identify the i-th measurement result in the M measurement results in the SSB measurement result reported by the terminal device to the network device. In this way, R0~R(M−1) have one-to-one correspondence to cell indexes corresponding to the M results. The indication information in this case indicates that a cell corresponding to one of the M measurement results is taken as the cell where the CSI-RS resource group (i.e., the CSI-RS resource group corresponding to the Resource set included in the resource setting associated with the Report Setting) is located. where R0~R(M−1) may be indexes of the measurement results.

In addition, it should also be noted that the cell identifier information field may not be configured. Instead, the network device directly determines the index of the CSI-RS resource group corresponding to the to-be-activated cell according to the RRM measurement result or the SSB measurement result, or determines the identifier information of the cell to be activated, or determines the index corresponding to one of the M measurement results reported by the terminal. That is, the index of the group, the cell identifier information or the index of the measurement result is directly indicated by the indication information.

In addition, in the foregoing Embodiments 1 to 4, the measurement reporting configuration may further include transmission power information of at least one reference signal of at least one cell, where the transmission power information includes a transmission power value of a reference signal of the cell, or a difference between a transmission power value of the reference signal of the cell and a transmission power value of the base reference signal.

For example, the reference signal transmission power of the instant cell (i.e. the current serving cell of the terminal device) is P0, the reference signal transmission power of the neighboring cell PCI1 is P1, and the reference signal transmission power of the neighboring cell PCI2 is P2, so that the network device may indicate, in the measurement reporting configuration, that the reference signal transmission power of the instant cell is P0, the reference signal transmission power of the cell of the PCI1 is indicated as P1, and the reference signal transmission power of the cell of the PCI2 is indicated as P2;

or, it is pre-defined that the reference signal transmission power of the current serving cell is the transmission power of the base reference signal, the transmission powers of the remaining reference signals are indicated by using the differential transmission power, and the differential transmission power is the difference between the actual transmission power of the reference signal of the neighboring cell and the transmission power of the base reference signal. For example, assuming that the reference signal transmission power of the present cell is P0, the transmission power of the reference signal of the neighboring cell PCI1 is P1, and the transmission power of the reference signal of the neighboring cell PCI2 is P2 In this way, the network device may indicate, through the measurement reporting configuration, that the transmission power of the reference signal of the present cell is P0, the transmission power of the reference signal of the cell of the PCI1 is indicated as P1-P0, and the transmission power of the reference signal of the cell of the PCI2 is indicated as P2-P0.

It can be known from the foregoing that the network device may configure the corresponding transmit power for a reference signal (e.g. SSB or CSI-RS) of each cell. In this way, even if the transmission powers of the reference signals of different cells are different, the network device sends to the terminal device the measurement reporting configuration carrying the transmission power information of the reference signals of at least one cell, and the terminal device may also determine the path losses corresponding to the different reference signals according to the transmission power information carried in the measurement reporting configuration and the reference signal receiving powers of the terminal device, so as to determine the optimal measurement result of the L1-RSRP. The path loss is equal to the difference between the transmission power and the receiving power of a reference signal.

The inter-cell measurement reporting methods provided in the embodiments of the present disclosure are described above, and the inter-cell measurement reporting apparatus provided in the embodiments of the present disclosure will be described below with reference to the accompanying drawings.

Figure 4:
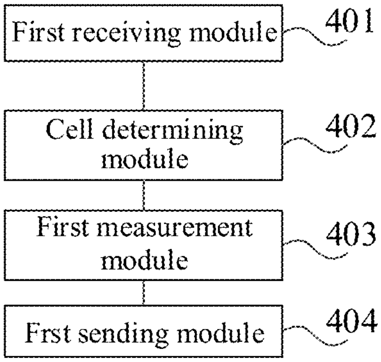
FIG. 4 is a structural block diagram of an inter-cell measurement reporting apparatus according to some embodiments of the present disclosure.

An embodiment of the present disclosure further provides an inter-cell measurement reporting apparatus, applied to a terminal device. As shown in FIG. 4, the apparatus includes the following modules:

- a first receiving module 401, configured to receive measurement reporting configuration and indication information of a to-be-measured cell sent by a network device;
- a cell determining module 402, configured to determine a to-be-measured cell according to the indication information;
- a first measurement module 403, configured to measure the to-be-measured cell according to the measurement reporting configuration to obtain a first measurement result;
- a first sending module 404, configured to report the first measurement result to the network device.

Optionally, the apparatus further includes:

- a second measurement module, configured to measure at least one predetermined cell to obtain a second measurement result;
- a third sending module, configured to report the second measurement result to the network device;
- wherein the indication information is determined according to the second measurement result.

Optionally, the second measurement result is a mobility management (Radio Resource Management (RRM)) measurement result or a Synchronization Signal Block (SSB) measurement result.

Optionally, the measurement reporting configuration includes related information of at least one candidate to-be-measured cell, and the indication information is configured to indicate the related information of the to-be-measured cell in the measurement reporting configuration.

Optionally, the measurement reporting configuration includes a physical cell identifier of at least one candidate to-be-measured cell, and the indication information is configured to indicate a physical cell identifier of a to-be-measured cell in the measurement reporting configuration.

Optionally, the measurement reporting configuration includes at least one first identifier, the first identifier is configured to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration;

the cell determining module 402 is specifically configured to:

- determine, as a target identifier, the first identifier indicated by the indication information;
- determine the cell to which the second measurement result represented by the target identifier belongs as the to-be-measured cell.

Optionally, the measurement reporting configuration includes one or more reference signal resources of one or more candidate to-be-measured cells, and the indication information is configured to indicate a reference signal resource of a to-be-measured cell in the measurement reporting configuration;

the cell determining module 402 is specifically configured to:

- determine, as a target reference signal resource, a reference signal resource indicated by the indication information;
- determine a cell to which the target reference signal resource belongs as the to-be-measured cell.

Optionally, all reference signal resources configured for the terminal device are divided into at least one resource group, and each resource group corresponds to one cell. The measurement reporting configuration includes identifiers of the resource groups corresponding to the candidate to-be-measured cells, and the indication information is configured to indicate an identifier of a resource group corresponding to a to-be-measured cell in the measurement reporting configuration;

the cell determining module 402 is specifically configured to:

determine, as a target resource group identifier, an identifier of a resource group indicated by the indication information;

determine a cell corresponding to the target resource group identifier as the to-be-measured cell.

Optionally, all reference signal resources configured for the terminal device are divided into at least one resource group, and each resource group corresponds to one cell. The measurement reporting configuration includes at least one first identifier configured for a resource group, the first identifier is used to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration;

the cell determining module 402 is specifically configured to:

determine, as a target identifier, a first identifier indicated by the indication information;

determine the cell to which the second measurement result represented by the target identifier belongs as the to-be-measured cell.

Optionally, the indication information includes related information of a to-be-measured cell.

Optionally, all reference signal resources configured for the terminal device are divided into at least one resource group, and each resource group corresponds to one cell. The indication information includes an identifier of a resource group corresponding to a to-be-measured cell;

The cell determining module 402 is specifically configured to:

determine the cell corresponding to the identifier of the resource group included in the indication information as the to-be-measured cell.

Optionally, the indication information includes an identifier of a third measurement result of a to-be-measured cell, and the third measurement result is a measurement result of the to-be-measured cell measured by the terminal device before the terminal device receives the measurement reporting configuration and the indication information;

the cell determining module 402 is specifically configured to:

determine the cell to which the third measurement result represented by the identifier included in the indication information belongs as the to-be-measured cell.

Optionally, the first measurement module 403 is specifically configured to:

measure a Synchronization Signal Block (SSB) or a Channel State Information Reference Signal (CSI-RS) of the to-be-measured cell according to the measurement reporting configuration.

Optionally, the measurement reporting configuration includes transmission power information of the reference signal of the at least one cell, and the transmission power information includes a transmission power value of the reference signal of the cell, or difference between the transmission power value of the reference signal of the cell and the transmission power value of a base reference signal.

Optionally, the base reference signal is predetermined, or is configured by the network device, or is indicated by the terminal device to the network device.

Figure 5:
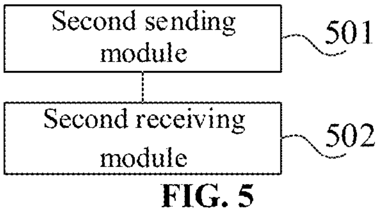
FIG. 5 is a structural block diagram of another inter-cell measurement reporting apparatus according to some embodiments of the present disclosure.

An embodiment of the present disclosure further provides an inter-cell measurement reporting apparatus, applied to a network device. As shown in FIG. 5, the apparatus includes the following modules:

a second sending module 501, configured to send measurement reporting configuration and indication information of a to-be-measured cell to a terminal device;

a second receiving module 502, configured to receive a first measurement result sent by the terminal device, where the first measurement result is obtained after the terminal device measures a to-be-measured cell according to the measurement reporting configuration and the indication information.

Optionally, the apparatus further includes:

a third receiving module, configured to receive a second measurement result sent by the terminal device, where the second measurement result is obtained after the terminal device performs measurement on at least one predetermined cell;

an indication determining module, configured to determine the indication information according to the second measurement result.

Optionally, the second measurement result is a mobility management (Radio Resource Management (RRM)) measurement result or a Synchronization Signal Block (SSB) measurement result.

Optionally, the measurement reporting configuration includes related information of at least one candidate to-be-measured cell, and the indication information is configured to indicate the related information of the to-be-measured cell in the measurement reporting configuration.

Optionally, the measurement reporting configuration includes a physical cell identifier of at least one candidate to-be-measured cell, and the indication information is configured to indicate a physical cell identifier of a to-be-measured cell in the measurement reporting configuration;

or the measurement reporting configuration includes at least one first identifier, the first identifier is configured to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration;

or the measurement reporting configuration includes one or more reference signal resources of one or more candidate to-be-measured cells, and the indication information is configured to indicate a reference signal resource of a to-be-measured cell in the measurement reporting configuration;

or all reference signal resources configured for the terminal device are divided into at least one resource group, and each resource group corresponds to one cell; the measurement reporting configuration includes identifiers of the resource groups corresponding to the candidate to-be-measured cells, and the indication information is configured to indicate an identifier of a resource group corresponding to a to-be-measured cell in the measurement reporting configuration;

or all reference signal resources configured for the terminal device are divided into at least one resource group, and each resource group corresponds to one cell; the measurement reporting configuration includes at least one first identifier configured for a resource group, the first identifier is configured to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration.

Optionally, the indication information includes related information of a to-be-measured cell.

Optionally, in a case that all reference signal resources configured for the terminal device are divided into at least one resource group and each resource group corresponds to one cell, the indication information includes an identifier of a resource group corresponding to a to-be-measured cell;

or the indication information includes an identifier of a third measurement result of a to-be-measured cell, and the third measurement result is a measurement result of the to-be-measured cell measured by the terminal device before the terminal device receives the measurement reporting configuration and the indication information.

It should be noted that, the division of the units in the embodiments of the present disclosure is schematic, and is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a processor-readable storage medium. Based on such understanding, an essential part, or a part contributing to the prior art, or all or part of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the method according to various embodiments of the present disclosure. The foregoing storage medium includes various media that can store program codes, such as a USB flash disk, a mobile hard disk, a Read-Only Memory (ROM), a Random Access Memory (RAM), a magnetic disk, or an optical disk.

It should be noted that the above-mentioned apparatus provided in the embodiments of the present disclosure can implement all method steps implemented by the foregoing method embodiments, and can achieve the same technical effect, and the same parts between the present embodiment and the method embodiment and beneficial effects of the embodiment are not described in detail herein.

Figure 6:
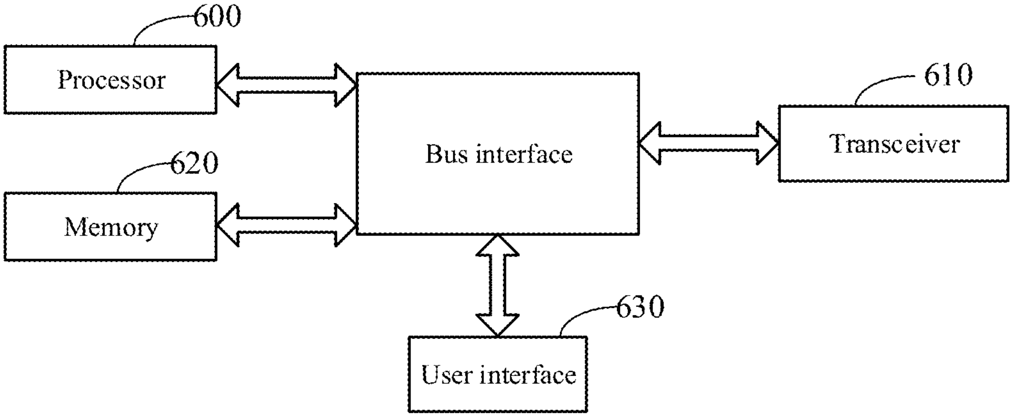
FIG. 6 is a structural block diagram of a terminal device according to some embodiments of the present disclosure.

An embodiment of the present disclosure further provides a terminal device, as shown in FIG. 6, the terminal device includes a memory 620, a transceiver 610, and a processor 600.

The memory 620 is configured to store a computer program.

The transceiver 610 is configured to receive and send data under the control of the processor 600.

The processor 600 is configured to read the computer program in the memory 620 and perform the following operations:

controlling the transceiver 610 to receive measurement reporting configuration and indication information of a to-be-measured cell sent by a network device;

determining a to-be-measured cell according to the indication information;

measuring the to-be-measured cell according to the measurement reporting configuration to obtain a first measurement result;

controlling the transceiver 610 to report the first measurement result to the network device.

Optionally, the processor 600 is further configured to: measure at least one predetermined cell to obtain a second measurement result;

the transceiver 610 is further configured to report the second measurement result to the network device;

wherein the indication information is determined according to the second measurement result.

Optionally, the second measurement result is a mobility management (Radio Resource Management (RRM)) measurement result or a Synchronization Signal Block (SSB) measurement result.

Optionally, the measurement reporting configuration includes related information of at least one candidate to-be-measured cell, and the indication information is configured to indicate the related information of the to-be-measured cell in the measurement reporting configuration.

Optionally, the measurement reporting configuration includes a physical cell identifier of at least one candidate to-be-measured cell, and the indication information is configured to indicate a physical cell identifier of a to-be-measured cell in the measurement reporting configuration.

Optionally, the measurement reporting configuration includes at least one first identifier, the first identifier is used to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration;

determining the to-be-measured cell according to the indication information includes:

determining, as a target identifier, the first identifier indicated by the indication information;

determining the cell to which the second measurement result represented by the target identifier belongs as the to-be-measured cell.

Optionally, the measurement reporting configuration includes one or more reference signal resources of one or more candidate to-be-measured cells, and the indication information is configured to indicate a reference signal resource of a to-be-measured cell in the measurement reporting configuration;

determining the to-be-measured cell according to the indication information includes:

determining a reference signal resource indicated by the indication information as a target reference signal resource;

determining a cell to which the target reference signal resource belongs as the to-be-measured cell.

Optionally, all reference signal resources configured for the terminal device are divided into at least one resource group, and each resource group corresponds to one cell. The measurement reporting configuration includes identifiers of the resource groups corresponding to the candidate to-be-measured cells, and the indication information is configured to indicate an identifier of a resource group corresponding to a to-be-measured cell in the measurement reporting configuration;

determining the to-be-measured cell according to the indication information includes:

determining, as a target resource group identifier, an identifier of a resource group indicated by the indication information;

determining a cell corresponding to the target resource group identifier as the to-be-measured cell.

Optionally, all reference signal resources configured for the terminal device are divided into at least one resource group, and each resource group corresponds to one cell. The measurement reporting configuration includes at least one first identifier configured for a resource group, the first identifier is used to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration;

determining a to-be-measured cell according to the indication information includes:

determining, as a target identifier, a first identifier indicated by the indication information;

determining the cell to which the second measurement result represented by the target identifier belongs as the to-be-measured cell.

Optionally, the indication information includes related information of a to-be-measured cell.

Optionally, all reference signal resources configured for the terminal device are divided into at least one resource group, and each resource group corresponds to one cell. The indication information includes an identifier of a resource group corresponding to a to-be-measured cell;

determining a to-be-measured cell according to the indication information includes:

determining the cell corresponding to the identifier of the resource group included in the indication information as the to-be-measured cell.

Optionally, the indication information includes an identifier of a third measurement result of a to-be-measured cell, and the third measurement result is a measurement result of the to-be-measured cell measured by the terminal device before the terminal device receives the measurement reporting configuration and the indication information;

determining a to-be-measured cell according to the indication information includes:

determining the cell to which the third measurement result represented by the identifier included in the indication information belongs as the to-be-measured cell.

Optionally, the measuring the to-be-measured cell according to the measurement reporting configuration includes:

measuring a Synchronization Signal Block (SSB) or a Channel State Information Reference Signal (CSI-RS) of the to-be-measured cell according to the measurement reporting configuration.

Optionally, the measurement reporting configuration includes transmission power information of the reference signal of the at least one cell, and the transmission power information includes a transmission power value of the reference signal of the cell, or difference between the transmission power value of the reference signal of the cell and the transmission power value of a base reference signal.

Optionally, the base reference signal is predetermined, or is configured by the network device, or is indicated by the terminal device to the network device.

In FIG. 6, a bus architecture may include any number of interconnected buses and bridges. Specifically, various circuits such as one or more processors represented by the processor 600 and a memory represented by the memory 620 are linked together. The bus architecture may also link together various other circuits, such as peripheral devices, voltage regulators, and power management circuits, etc. which are well known in the art, and therefore are not further described herein. The bus interface provides an interface. The transceiver 610 may be a plurality of elements, i.e. include a transmitter and a receiver, and provide units for communicating with various other devices on a transmission medium. The transmission medium includes transmission media such as a wireless channel, a wired channel, and an optical cable. For different user equipments, a user interface 630 may also be an interface that can be externally connected to a required device, and the connected device includes, but is not limited to, a keypad, a display, a speaker, a microphone, a joystick, etc.

The processor 600 is responsible for managing bus architectures and general processing, and the memory 620 may store data used by the processor 600 when performing operations.

Optionally, the processor 600 may be a CPU (a central processor), an ASIC (Application Specific Integrated Circuit), an FPGA (Field-Programmable Gate Array) or a CPLD (Complex Programmable Logic Device), and the processor 600 may also adopt a multi-core architecture.

The processor 600 is configured to, by invoking the computer program stored in the memory 620, perform any of the methods provided in the embodiments of the present disclosure according to the obtained executable instructions. The processor 600 and the memory 620 may also be physically separately arranged.

Figure 7:
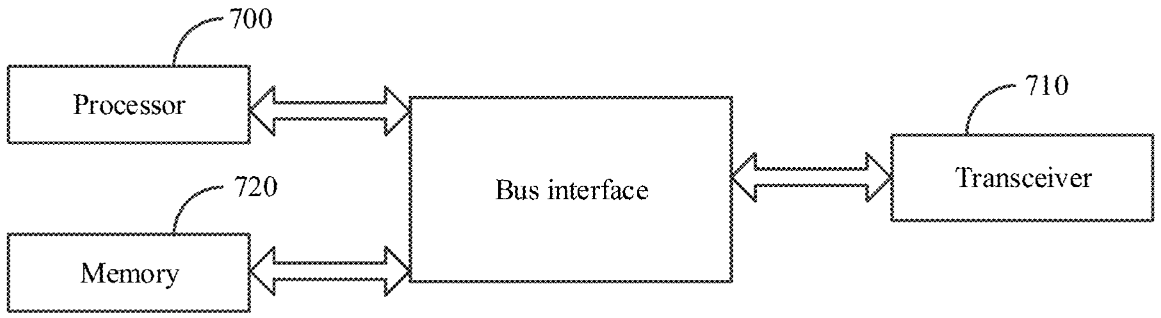
FIG. 7 is a structural block diagram of a network device according to some embodiments of the present disclosure.

An embodiment of the present disclosure further provides a network device, as shown in FIG. 7, the network device includes a memory 720, a transceiver 710, and a processor 700.

The memory 720 is configured to store a computer program.

The transceiver 710 is configured to receive and send data under the control of the processor 700.

The processor 700 is configured to read the computer program in the memory 720 and perform the following operations:

controlling the transceiver 710 to send measurement reporting configuration and indication information of a to-be-measured cell to a terminal device;

controlling the transceiver 710 to receive a first measurement result sent by the terminal device, where the first measurement result is obtained after the terminal device measures a to-be-measured cell according to the measurement reporting configuration and the indication information.

Optionally, the measurement reporting configuration includes related information of at least one candidate to-be-measured cell, and the indication information is configured to indicate related information of a to-be-measured cell in the measurement reporting configuration.

Optionally, the measurement reporting configuration includes a physical cell identifier of at least one candidate to-be-measured cell, and the indication information is configured to indicate a physical cell identifier of a to-be-measured cell in the measurement reporting configuration;

or, the measurement reporting configuration includes at least one first identifier, the first identifier is configured to identify a second measurement result, the second measurement result is a measurement result of the candidate to-be-measured cell measured by the terminal device before the terminal device receives the measurement reporting configuration and the indication information, and the indication information is configured to indicate a first identifier corresponding to a to-be-measured cell in the measurement reporting configuration;

or, the measurement reporting configuration includes one or more reference signal resources of one or more candidate to-be-measured cells, and the indication information is configured to indicate a reference signal resource of a to-be-measured cell in the measurement reporting configuration;

or, in a case that all reference signal resources configured for the terminal device are divided into at least one resource group and each resource group corresponds to one cell, the measurement reporting configuration includes identifiers of the resource groups corresponding to the candidate to-be-measured cells, and the indication information is configured to indicate an identifier of a resource group corresponding to a to-be-measured cell in the measurement reporting configuration;

or, in a case that all reference signal resources configured for the terminal device are divided into at least one resource group and one resource group corresponds to one cell, measurement reporting configuration includes at least one first identifier configured for a resource group, the first identifier is used to identify a second measurement result, and the second measurement result is a measurement result of the candidate to-be-measured cell measured by the terminal device before the terminal device receives the measurement reporting configuration and the indication information, the indication information is configured to indicate a first identifier corresponding to a to-be-measured cell in the measurement reporting configuration.

Optionally, the indication information includes related information of a to-be-measured cell.

Optionally, in a case that all reference signal resources configured for the terminal device are divided into at least one resource group and each resource group corresponds to one cell, the indication information includes an identifier of a resource group corresponding to a to-be-measured cell;

or, the indication information includes an identifier of a third measurement result of a to-be-measured cell, and the third measurement result is a measurement result of the to-be-measured cell measured by the terminal device before the terminal device receives the measurement reporting configuration and the indication information.

In FIG. 7, a bus architecture may include any number of interconnected buses and bridges. Specifically various circuits such as one or more processors represented by the processor 700 and the memory represented by the memory 720 are linked together. The bus architecture may also link together various other circuits, such as peripheral devices, voltage regulators, and power management circuits, etc. which are well known in the art, and therefore are not further described herein. The bus interface provides an interface. The transceiver 710 may be a plurality of elements, i.e. include a transmitter and a receiver, and provide units for communicating with various other apparatuses on transmission media, and these transmission media include transmission media such as a wireless channel, a wired channel, and an optical cable. The processor 700 is responsible for managing bus architectures and general processing, and the memory 720 may store data used by the processor 700 when performing operations.

The processor 700 may be a Central Processing Unit (CPU), an Application Specific Integrated Circuit (ASIC), a Field-Programmable Gate Array (FPGA), or a Complex Programmable Logic Device (CPLD), and the processor 700 may also adopt a multi-core architecture.

It should be noted that the above-mentioned apparatus provided in the embodiments of the present disclosure can implement all method steps implemented by the foregoing method embodiments, and can achieve the same technical effect, and the same parts between this embodiment and the method embodiment and beneficial effects of this embodiment are not described in detail herein.

Embodiments of the present disclosure further provide a processor-readable storage medium, where the processor-readable storage medium stores a computer program, and the computer program is configured to cause a processor to perform the inter-cell measurement reporting methods according to any one of the foregoing method embodiments.

The processor-readable storage medium may be any usable medium or data storage device accessible by the processor, and includes, but is not limited to, a magnetic memory (for example, a floppy disk, a hard disk, a magnetic tape, a magneto-optical disk (MO), etc.), an optical memory (such as CD, DVD, BD, HVD, etc.), and a semiconductor memory (for example, a ROM, an EPROM, an EEPROM, a non-volatile memory (NAND Flash), a solid state disk (SSD)), etc.

Those skilled in the art should understand that the embodiments of the present disclosure may be provided as a method, a system, or a computer program product. Thus, the present disclosure may take the form of an entire hardware embodiment, an entire software embodiment, or embodiments incorporating software and hardware aspects. Moreover, the present disclosure may take the form of a computer program product implemented on one or more computer-usable storage media (including but not limited to a disk memory and an optical memory, etc.) including computer-usable program codes.

The present disclosure is described with reference to flowcharts and/or block diagrams of methods, apparatus (systems), and computer program products according to embodiments of the present disclosure. It should be understood that each flow and/or block in the flowcharts and/or block diagrams, and combinations of flows and/or blocks in the flowcharts and/or block diagrams, can be implemented by computer-executable instructions. These computer-executable instructions may be provided to a processor of a general purpose computer, a special purpose computer, an embedded processor, or other programmable data processing device to generate a machine such that instructions executed by a processor of the computer or other programmable data processing device generate means for implementing functions specified in one or more flows of the flowchart and/or one or more blocks of the block diagram.

These processor-executable instructions may also be stored in a processor-readable memory that can direct a computer or other programmable data processing device to operate in a particular manner such that the instructions stored in the processor-readable memory produce a product that includes an instruction device that implements the functions specified in one or more flows of the flowchart and/or one or more blocks of the block diagram.

These processor-executable instructions may also be loaded onto a computer or other programmable data processing device such that a series of operational steps are performed on a computer or other programmable device to produce a computer-implemented process, such that the instructions executed on the computer or other programmable device provide steps for implementing the functions specified in one or more flows of the flowchart and/or one or more blocks of the block diagram.

The apparatus embodiments described above are merely illustrative, wherein the units described as separate components may or may not be physically separate, and components displayed as units may or may not be physical units, that is, may be located in one place, or may also be distributed on multiple network units. Some or all of the modules may be selected according to actual needs to achieve the objectives of the solutions of the embodiments. A person of ordinary skill in the art may understand and implement the foregoing without involving any inventive effort.

Various component embodiments of the present disclosure may be implemented in hardware, or in software modules running on one or more processors, or implemented in combinations thereof. It should be understood by those skilled in the art that a microprocessor or a digital signal processor (DSP) may be used in practice to implement some or all of the functions of some or all of the components in the computing processing device according to embodiments of the present disclosure. The present disclosure may also be implemented as a device or apparatus program (e.g. a computer program and a computer program product) for performing a portion or all of the methods described herein. Such a program implementing the present disclosure may be stored on a computer-readable medium, or may have a form of one or more signals. Such signals may be downloaded from an Internet website, or provided on a carrier signal, or provided in any other form.

Figure 8:
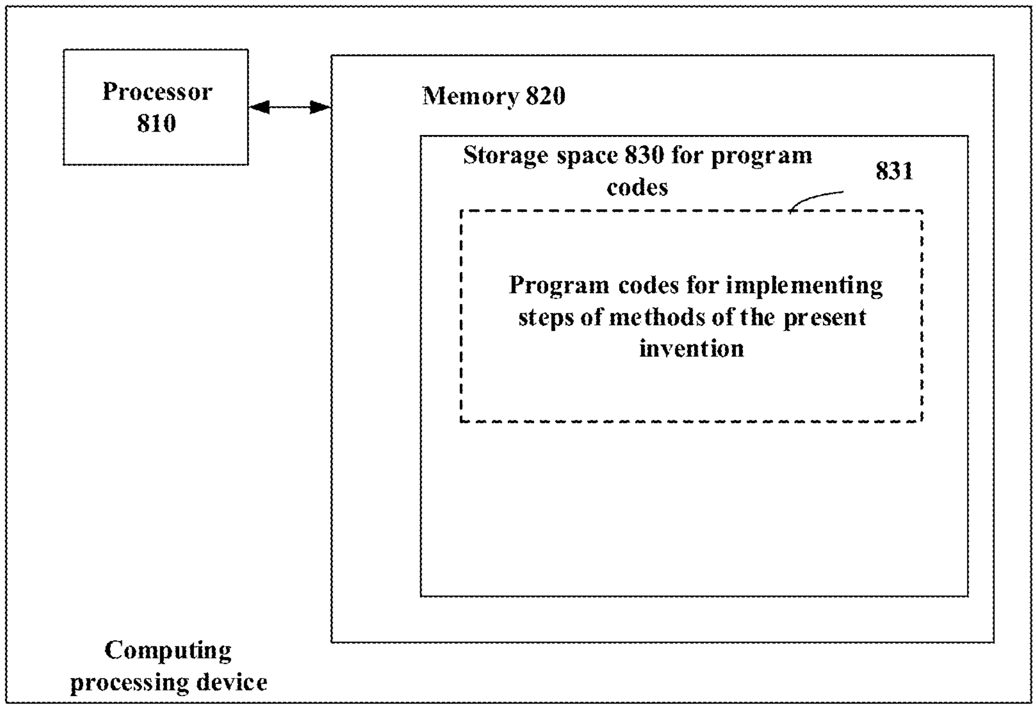
FIG. 8 schematically illustrates a block diagram of a computing processing device for performing the method according to the present disclosure.
Figure 9:
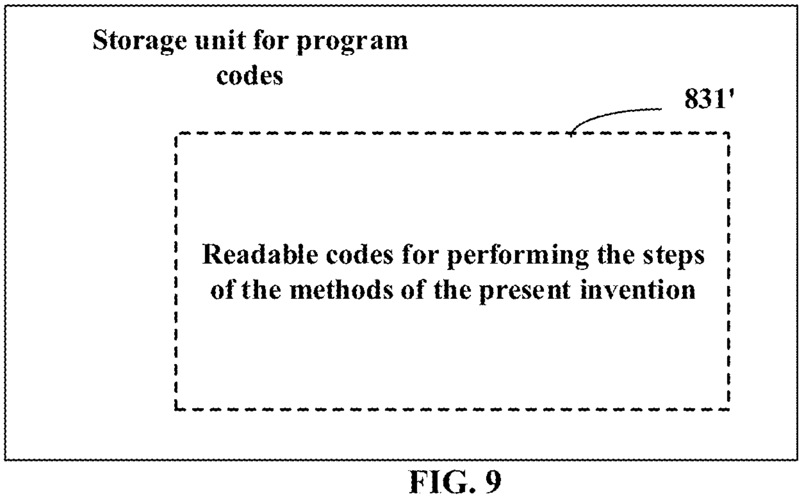
FIG. 9 schematically illustrates a storage unit for holding or carrying program codes implementing the method according to the present disclosure.

For example, FIG. 8 illustrates a computing processing device that may implement the methods according to the present disclosure. The computing processing device traditionally includes a processor 810 and a computer program product or computer-readable medium in the form of a memory 820. The memory 820 may be an electronic memory such as a flash memory, an EEPROM (electrically erasable programmable read-only memory), an EPROM, a hard disk, or a ROM. The memory 820 has a storage space 830 for a program code 831 for executing any of the method steps described above, for example, the storage space 830 for the program code may include respective program codes 831 for implementing various steps in the above method, respectively. These program code may be read or written into the one or more computer program products from one or more computer program products. These computer program products include program code carriers such as hard disks, compact disks (CD), memory cards, or floppy disks. Such a computer program product is typically a portable or fixed storage unit as described with reference to FIG. 9. The storage unit may have a storage segment, a storage space, and the like arranged similarly to the memory 820 in the computing processing device of FIG. 8. The program codes may be compressed, for example, in an appropriate form. Generally, the storage unit includes the computer readable codes 831', i.e. codes that may be read by a processor 810, and when the codes are executed by the computing processing device, the computing processing device performs various steps in the methods described above.

As referred to herein, "one embodiment", "an embodiment", or "one or more embodiments" means that a particular feature, structure, or characteristic described in connection with the embodiment is included in at least one embodiment of the present disclosure. In addition, please note that word examples "in one embodiment" herein do not necessarily refer to the same embodiment.

In the specification provided herein, numerous specific details are illustrated. It is to be understood, however, that embodiments of the present disclosure may be practiced without these specific details. In some examples, well-known methods, structures, and techniques are not shown in detail so as not to obscure the understanding of this specification.

In the claims, any reference symbols located within parentheses shall not be configured to limit the claims. The word "including" does not exclude the presence of elements or steps not listed in the claims. The word "a" or "an" before the element does not exclude the presence of a plurality of such elements. The present disclosure may be implemented by means of hardware including several different elements and by means of suitably programmed computers. In the unit claims enumerating several devices or units, several of these devices or units may be embodied by the same hardware item. The use of words such as 'first', 'second', 'third' and the like does not represent any order. These words may be interpreted as names.

Obviously, those skilled in the art may make various modifications and variations to the present disclosure without departing from the spirit and scope of the present disclosure. Thus, if these modifications and variations of the present disclosure fall within the scope of the claims and their equivalents, the present disclosure is also intended to encompass these modifications and variations.

What is claimed is:

1. An inter-cell measurement reporting method performed by a terminal device, comprising:

receiving measurement reporting configuration and indication information of one or more to-be-measured cells sent by a network device;

determining at least one to-be-measured cell according to the indication information;

measuring the at least one to-be-measured cell according to the measurement reporting configuration, to obtain a first measurement result; and reporting the first measurement result to the network device, wherein the measurement reporting configuration comprises related information of one or more candidate to-be-measured cells, and the indication information is configured to indicate related information of the at least one to-be-measured cell in the measurement reporting configuration;

wherein all reference signal resources configured for the terminal device are divided into at least one resource group, and each resource group of the at least one resource group corresponds to one cell;

the measurement reporting configuration comprises at least one identifier of at least one resource groups corresponding to the one or more candidate to-be-measured cells, and the indication information is configured to indicate at least one identifier of at least one resource group corresponding to the at least one to-be-measured cell in the measurement reporting configuration; wherein determining the at least one to-be-measured cell according to the indication information comprises: determining at least one identifier of at least one resource group indicated by the indication information as at least one target resource group identifier; and determining at least one cell corresponding to the at least one target resource group identifier as the at least one to-be-measured cell;

or, the measurement reporting configuration comprises at least one first identifier configured for one resource group of the at least one resource group, the at least one first identifier is configured to identify at least one second measurement result, and the at least one second measurement result is at least one measurement result of the one or more candidate to-be-measured cells measured by the terminal device before the terminal device receives the measurement reporting configuration and the indication information, the indication information is configured to indicate at least one of the at least one first identifier corresponding to the at least one to-be-measured cell in the measurement reporting configuration; wherein determining the at least one to-be-measured cell according to the indication information comprises: determining at least one of the at least one first identifier indicated by the indication information as at least one target identifier; determining the at least one cell to which the at least one second measurement result represented by the at least one target identifier belongs as the at least one to-be-measured cell;

or, wherein the indication information comprises related information of a to-be-measured cell;

wherein all reference signal resources configured for the terminal device are divided into at least one resource group, and each resource group of the at least one resource group corresponds to one cell, the indication information comprises at least one identifier of at least one resource group corresponding to the at least one to-be-measured cell; determining the at least one to-be-measured cell according to the indication information includes: determining the at least one cell corresponding to the at least one identifier of the at least one resource group comprised in the indication information as the at least one to-be-measured cell;

or, the indication information comprises at least one identifier of at least one third measurement result of the at least one to-be-measured cell, and the at least one third measurement result is at least one measurement result of the to-be-measured cell measured by the terminal device before the terminal device receives the measurement reporting configuration and the indication information; determining the at least one to-be-measured cell according to the indication information comprises: determining the at least one cell to which the at least one third measurement result represented by the at least one identifier comprised in the indication information belongs as the at least one to-be-measured cell.

2. The inter-cell measurement reporting method according to claim 1, wherein before receiving the measurement reporting configuration and the indication information of the one or more to-be-measured cells sent by the network device, the method further comprises:

measuring at least one predetermined cell to obtain a second measurement result;

reporting the second measurement result to the network device;

wherein the indication information is determined according to the second measurement result.

3. The inter-cell measurement reporting method according to claim 2, wherein the second measurement result is a Radio Resource Management (RRM) measurement result or a Synchronization Signal Block (SSB) measurement result.

4. The inter-cell measurement reporting method according to claim 1, wherein the measurement reporting configuration comprises at least one physical cell identifier of the one or more candidate to-be-measured cells, and the indication information is configured to indicate at least one physical cell identifier of the at least one to-be-measured cell in the measurement reporting configuration.

5. The inter-cell measurement reporting method according to claim 1, wherein the measurement reporting configuration comprises at least one first identifier, the at least one first identifier is configured to identify at least one second measurement result, the at least one second measurement result is at least one measurement result of the one or more candidate to-be-measured cells measured by the terminal device before the terminal device receives the measurement reporting configuration and the indication information, and the indication information is configured to indicate at least one first identifier corresponding to the at least one to-be-measured cell in the measurement reporting configuration.

6. The inter-cell measurement reporting method according to claim 1, wherein the measurement reporting configuration includes one or more reference signal resources of the one or more candidate to-be-measured cells, and the indication information is configured to indicate at least one reference signal resource of the at least one to-be-measured cell in the measurement reporting configuration.

7. The inter-cell measurement reporting method according to claim 1, wherein measuring the at least one to-be-measured cell according to the measurement reporting configuration comprises:

measuring one or more Synchronization Signal Blocks (SSBs) or one or more Channel State Information Reference Signals (CSI-RSs) of the at least one to-be-measured cell according to the measurement reporting configuration;

and/or, the measurement reporting configuration comprises transmission power information of at least one reference signal of at least one cell, and the transmission power information comprises a transmission power value of a reference signal of a cell, or difference between a transmission power value of a reference signal of a cell and a transmission power value of a base reference signal.

8. An inter-cell measurement reporting method performed by a network device, wherein the method comprises:

sending measurement reporting configuration and indication information of at least one to-be-measured cell to a terminal device;

receiving a first measurement result sent by the terminal device, wherein the first measurement result is obtained after the terminal device measures the at least one to-be-measured cell according to the measurement reporting configuration and the indication information, wherein the measurement reporting configuration comprises related information of one or more candidate to-be-measured cells, and the indication information is configured to indicate related information of the at least one to-be-measured cell in the measurement reporting configuration, wherein all reference signal resources configured for the terminal device are divided into at least one resource group and each resource group of the at least one resource group corresponds to one cell, the measurement reporting configuration comprises at least one identifier of at least one resource groups corresponding to the one or more candidate to-be-measured cells, and the indication information is configured to indicate at least one identifier of at least one resource group corresponding to at least one to-be-measured cell in the measurement reporting configuration; or, the measurement reporting configuration comprises at least one first identifier configured for one resource group of the at least one resource group, the first identifier is configured to identify at least one second measurement result, and the at least one second measurement result is at least one measurement result of the one or more candidate to-be-measured cells measured by the terminal device before the terminal device receives the measurement reporting configuration and the indication information, the indication information is configured to indicate at least one first identifier corresponding to at least one to-be-measured cell in the measurement reporting configuration;

or, wherein the indication information comprises related information of the at least one to-be-measured cell;

in a case that all reference signal resources configured for the terminal device are divided into at least one resource group and each resource group of the at least one resource group corresponds to one cell, the indication information comprises at least one identifier of at least one resource group corresponding to the at least one to-be-measured cell; or the indication information comprises at least one identifier of at least one third measurement result of at least one to-be-measured cell, and the at least one third measurement result is at least one measurement result of the at least one to-be-measured cell measured by the terminal device before the terminal device receives the measurement reporting configuration and the indication information.

9. The inter-cell measurement reporting method according to claim 8, wherein before sending the measurement reporting configuration and the indication information of the at least one to-be-measured cell to the terminal device, the method further comprises:

receiving at least one second measurement result sent by the terminal device, where the at least one second measurement result is obtained after the terminal device performs measurement on at least one predetermined cell;

determining the indication information according to the at least one second measurement result.

10. The inter-cell measurement reporting method according to claim 9, wherein the at least one second measurement result is a Radio Resource Management (RRM) measurement result or a Synchronization Signal Block (SSB) measurement result.

11. The inter-cell measurement reporting method according to claim 8, wherein, the measurement reporting configuration comprises at least one physical cell identifier of the one or more candidate to-be-measured cells, and the indication information is configured to indicate at least one physical cell identifier of at least one to-be-measured cell in the measurement reporting configuration;

or, the measurement reporting configuration comprises at least one first identifier, the at least one first identifier is configured to identify at least one second measurement result, the at least one second measurement result is at least one measurement result of the one or more candidate to-be-measured cells measured by the terminal device before the terminal device receives the measurement reporting configuration and the indication information, and the indication information is configured to indicate at least one first identifier corresponding to the at least one to-be-measured cell in the measurement reporting configuration;

or, the measurement reporting configuration comprises one or more reference signal resources of the one or more candidate to-be-measured cells, and the indication information is configured to indicate at least one reference signal resource of the at least one to-be-measured cell in the measurement reporting configuration.

12. A terminal device, comprising:

a memory, a transceiver, and a processor, wherein the memory is configured to store a computer program, the transceiver is configured to transmit and receive data under control of the processor, the processor is configured to read a computer program in the memory and execute the following operations:

controlling the transceiver to receive measurement reporting configuration and indication information of one or more to-be-measured cells sent by a network device;

determining at least one to-be-measured cell according to the indication information;

measuring the at least one to-be-measured cell according to the measurement reporting configuration, to obtain a first measurement result;

controlling the transceiver to report the first measurement result to the network device, wherein the measurement reporting configuration comprises related information of one or more candidate to-be-measured cells, and the indication information is configured to indicate related information of the at least one to-be-measured cell in the measurement reporting configuration;

wherein all reference signal resources configured for the terminal device are divided into at least one resource group, and each resource group of the at least one resource group corresponds to one cell;

the measurement reporting configuration comprises at least one identifier of at least one resource groups corresponding to the one or more candidate to-be-measured cells, and the indication information is configured to indicate at least one identifier of at least one resource group corresponding to the at least one to-be-measured cell in the measurement reporting configuration; wherein determining the at least one to-be-measured cell according to the indication information comprises: determining at least one identifier of at least one resource group indicated by the indication information as at least one target resource group identifier; and determining at least one cell corresponding to the at least one target resource group identifier as the at least one to-be-measured cell;

or, the measurement reporting configuration comprises at least one first identifier configured for one resource group of the at least one resource group, the at least one first identifier is configured to identify at least one second measurement result, and the at least one second measurement result is at least one measurement result of the one or more candidate to-be-measured cells measured by the terminal device before the terminal device receives the measurement reporting configuration and the indication information, the indication information is configured to indicate at least one of the at least one first identifier corresponding to the at least one to-be-measured cell in the measurement reporting configuration; wherein determining the at least one to-be-measured cell according to the indication information comprises: determining at least one of the at least one first identifier indicated by the indication information as at least one target identifier; determining the at least one cell to which the at least one second measurement result represented by the at least one target identifier belongs as the at least one to-be-measured cell;

or, wherein the indication information comprises related information of a to-be-measured cell;

wherein all reference signal resources configured for the terminal device are divided into at least one resource group, and each resource group of the at least one resource group corresponds to one cell, the indication information comprises at least one identifier of at least one resource group corresponding to the at least one to-be-measured cell; determining the at least one to-be-measured cell according to the indication information includes: determining the at least one cell corresponding to the at least one identifier of the at least one resource group comprised in the indication information as the at least one to-be-measured cell;

or, the indication information comprises at least one identifier of at least one third measurement result of the at least one to-be-measured cell, and the at least one third measurement result is at least one measurement result of the to-be-measured cell measured by the terminal device before the terminal device receives the measurement reporting configuration and the indication information; determining the at least one to-be-measured cell according to the indication information comprises: determining the at least one cell to which the at least one third measurement result represented by the at least one identifier comprised in the indication information belongs as the at least one to-be-measured cell.

13. A network device, comprising:

a memory, a transceiver, and a processor, wherein the memory is configured to store a computer program, the transceiver is configured to send and receive data under a control of the processor, the processor is configured to read the computer program in the memory and execute steps of the method according to claim 8.

* * * * *